United States Patent
McQuistan et al.

(10) Patent No.: US 10,409,831 B2
(45) Date of Patent: Sep. 10, 2019

(54) ATHLETIC INTELLIGENCE SYSTEM

(71) Applicant: Impakt Athletics, Inc., Waukee, IA (US)

(72) Inventors: Zac McQuistan, Sammamish, WA (US); Jason Brescia, Seattle, WA (US)

(73) Assignee: Impakt Athletics, Inc., Waukee, IA (US)

( * ) Notice: Subject to any disclaimer, the term of this patent is extended or adjusted under 35 U.S.C. 154(b) by 395 days.

(21) Appl. No.: 15/140,968

(22) Filed: Apr. 28, 2016

(65) Prior Publication Data

US 2016/0320941 A1 Nov. 3, 2016

Related U.S. Application Data

(60) Provisional application No. 62/153,847, filed on Apr. 28, 2015.

(51) Int. Cl.

| | |
|---|---|
| *G06F 7/00* | (2006.01) |
| *G06F 16/25* | (2019.01) |
| *G06T 11/20* | (2006.01) |
| *G09B 5/02* | (2006.01) |
| *G06F 3/0481* | (2013.01) |
| *G06F 17/24* | (2006.01) |
| *G06N 5/02* | (2006.01) |

(52) U.S. Cl.
CPC ........ *G06F 16/252* (2019.01); *G06F 3/04812* (2013.01); *G06F 17/241* (2013.01); *G06N 5/02* (2013.01); *G06T 11/203* (2013.01); *G09B 5/02* (2013.01)

(58) Field of Classification Search
None
See application file for complete search history.

(56) References Cited

U.S. PATENT DOCUMENTS

| | | | |
|---|---|---|---|
| 8,463,765 B2 | 6/2013 | Lesavich | |
| 9,185,361 B2 | 11/2015 | Curry | |
| 9,283,457 B2 | 3/2016 | Thurman et al. | |
| 9,817,883 B2* | 11/2017 | Barthel | G06F 16/435 |

(Continued)

OTHER PUBLICATIONS

Sha, Long: "Chalkboarding: A New Spatiotemporal Query Paradigm for Sports Play Retrieval", Mar. 2016.

*Primary Examiner* — Eliyah S. Harper
(74) *Attorney, Agent, or Firm* — Goodhue, Coleman & Owens, P.C.

(57) ABSTRACT

A method for technology-driven athletic intelligence includes providing a database stored on a non-transitory computer readable medium wherein the database is structured to store data about a plurality of athletic entities, providing a plurality of applications configured to communicate with the database and collect contextual or situation data, providing an analytics engine in operative communication with the database and each of the plurality of applications, receiving a first data input from a user through one of the plurality of applications wherein the first data input provides contextual or situation data, storing the first data input in the database, applying at least a first tag using the first data input to one of the entities wherein the first tag describes the one of the athletic entities, and analyzing data using the analytics engine to generate insight and delivering the insight to a user through one of the plurality of applications.

15 Claims, 39 Drawing Sheets

(56) References Cited

U.S. PATENT DOCUMENTS

| | | | |
|---|---|---|---|
| 10,223,430 B2* | 3/2019 | McQuistan | G06F 16/252 |
| 2013/0060362 A1 | 3/2013 | Murphy et al. | |
| 2013/0138590 A1 | 5/2013 | Huke et al. | |
| 2013/0139068 A1 | 5/2013 | Bowring | |
| 2013/0316837 A1* | 11/2013 | Coiner, Jr. | G07F 17/38 |
| | | | 463/43 |
| 2014/0337346 A1* | 11/2014 | Barthel | G06F 16/435 |
| | | | 707/738 |
| 2015/0142716 A1* | 5/2015 | Lucey | G06N 5/022 |
| | | | 706/46 |
| 2016/0253919 A1* | 9/2016 | Coiner | G06F 16/73 |
| | | | 463/31 |

* cited by examiner

ATHLETIC INTELLIGENCE SYSTEM

PRIORITY STATEMENT

This application claims priority to U.S. Provisional Patent Application No. 62/153,847, filed Apr. 28, 2015, hereby incorporated by reference in its entirety.

FIELD OF THE INVENTION

The present invention relates to sports technologies. More specifically, but not exclusively, the present invention relates to an athletic intelligence system and related methods.

BACKGROUND

In preparation for delivering a great performance on the field, court, or ice—athletic coaches have an incredible amount of work to do off the field before the game begins. Each week, coaches must review film from opponents to identify weaknesses and opportunities, review their own film to correct their mistakes, analyze these observations for trends, create practice and game plans to execute on those opportunities, and then install their plans to enable their team to execute them on the field. Each piece of the process requires understanding and filtering an incredible amount of information and coordinating complex coaching tools, which is often attempted manually today.

What is needed are new technologies including methods and systems that allow for information to be shared across other tools, experiences, and processes.

SUMMARY

Therefore, it is a primary object, feature, or advantage of the present invention to improve over the state of the art.

It is a further object, feature, or advantage of the present invention to provide methods and systems that collect data relevant to athletic performance.

It is a still further object, feature, or advantage of the present invention to provide for analyzing data in a way that assists in enhancing athletic performance.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, a system for athletic intelligence includes a database storing data indicative of a plurality of experiences on a non-transitory computer readable storage medium and an analytics engine in operative communication with the database, wherein the analytics engine is configured to analyze the data to provide insight for use in improving athletic performance.

According to another aspect, a method for providing athletic intelligence includes providing a database storing data indicative of a plurality of experiences on a non-transitory computer readable storage medium and an analytics engine in operative communication with the database, wherein the analytics engine is configured to analyze the data, receiving as input data related to the plurality of experiences and storing the data on the non-transitory computer readable storage medium, and analyzing the data to provide insight for use in improving athletic performance using the analytics engine.

According to another aspect, a unique conversion process of (X. Y) data to recognized athletic entities (ex: assignments, actions, positions, players, formations, etc.) enables it to utilize natural user interfaces—giving users the benefits of big data without the hassles of collection. It automatically converts seemingly unique data inputs into a structured data set ready for traditional analysis techniques.

According to another aspect, the process may be used to associate and tag data to entities to enable automated data analysis, delivery of deeper insights to coaches and maximum efficiency in other coaching process. Automated data analysis will save multiple hours for every coach, every week. Deeper insights are enabled through the depth of classifications and rolling data into similar categories—enabling coaches to get the benefits of big data without requiring the user to have that skill set. Leveraging the data sources on behalf of the coach will also save them large amounts of time.

According to another aspect, building the Athletic Intelligence System with multiple unique experiences, structured for data collection, allows coaches to optimally accomplish their tasks for the week while collecting data in the most frictionless way possible. The automatic data calls on the coach's behalf allows the coach to express the data once, but gain the benefit of expressing the data across the platform. This approach looks at each experience as a data source and complements with industry knowledge to enable maximum benefit with minimal effort/friction for a coach.

According to another aspect, leveraging data input conversion techniques is performed to create structured data from seemingly unrelated inputs for macro analysis purposes is unique. The component tagging and system structure enables the system to share insights based on macro data analysis, without giving away trade secrets of any coaching staff. This enables better recommendations for coaches using this Athletic Intelligence System.

According to another aspect, with coaches scouting opponents on our platform, combined with the robust situational data collected surrounding situations and look-a-like coaches across the nation (or the world)—the system better understands why decisions are made by the opponent. This enables the prediction engine to predict how likely situations are to occur both before and during the game—and suggest a better game plan or approach.

According to another aspect, the present invention captures specific coach actions/responses to the specific surfaced insights. This connection of insights to action enables analysis of various strategies given certain situations. Using the surrounding situational data captured in the experiences, the system may produce insights at a level of depth and automation. For example, the system may immediately calculate grades of players for pass blocking vs. run blocking, various blocking techniques, against different opponents, and throughout the duration of a game—suggesting players for certain system fits or assignments.

According to another aspect, a method for providing technology-driven athletic intelligence is provided. The method includes providing a database stored on a non-transitory computer readable medium wherein the database is structured to store data about a plurality of athletic entities. The method further includes providing a plurality of applications, each of the plurality of applications configured to communicate with the database and collect contextual or situation data. The method further includes providing an analytics engine in operative communication with the database and each of the plurality of applications. The method further includes receiving a first data input from a user through one of the plurality of applications wherein the first data input provides contextual or situation data. The method further includes storing the first data input in the database, applying at least a first tag using the first data input to one of the entities wherein the first tag describes the one of the athletic entities, and analyzing data within the database using the analytics engine to generate insight and delivering the insight to a user through one of the plurality of applications. The athletic entities may include a player assignment, a player, a play, and a play formation. The applications may include a practice companion application configured to build a script of a plurality plays or drills for practicing or a play book application configured to build one or more plays. The applications may include a film analysis component to analyze what happened during a game or practice. The step of analyzing data may include statistically analyzing data and may include analyzing macro data from a plurality of teams.

According to another aspect, a non-transitory computer-readable storage device having processor-executable instructions embodied thereon, for providing an athletic intelligence system or a portion thereof wherein when executed by a server computing device communicatively coupled to a database and to the at least one client computing device, the processor-executable instructions cause the server computing device to execute one or more methods to improve athletic performance or results.

According to another aspect, a system for providing technology-driven athletic intelligence is provided. The system includes a database stored on a non-transitory computer readable medium wherein the database is structured to store data about a plurality of athletic entities, a plurality of applications, each of the plurality of applications configured to communicate with the database and collect contextual or situation data, and an analytics engine in operative communication with the database and each of the plurality of applications. The system is configured for receiving a first data input from a user through one of the plurality of applications wherein the first data input provides contextual or situation data, storing the first data input in the database, applying at least a first tag using the first data input to one of the entities wherein the first tag describes the one of the athletic entities, and analyzing data within the database using the analytics engine to generate insight and delivering the insight to a user through one of the plurality of applications.

BRIEF DESCRIPTION OF THE DRAWINGS

FIG. 17 shows another screen display illustrating how data from the companion app collected with a mobile device may be combined with video.

FIG. 18 illustrates a screen display where real-time coach data is combined.

FIG. 19 is another screen display where real-time coach data is combined.

DETAILED DESCRIPTION

The present invention relates to an Athletic Intelligence System, which unifies the data and information for coaches across multiple "experiences". Each "experience" within the system is designed to enhance a coach task, but also collect data in the most natural way possible. The present invention may include the combination of the experiences and the process in which data is collected and enabled and insights are provided to make other coach processes more efficient by making insight more usable. This process may include data collection, classification, association, integration, analysis, prioritization, delivery, mobilization, and storage.

As used herein the term "experience" is used to describe an offering designed to assist with a specific coaching task. The experiences include, without limitation: game companion, practice companion, training companion, film analysis, practice plan, development plan, game plan, game plan install, intelligent playbook, team management, staff management, and administrative.

Each experience enhances the task at hand, but is also specifically designed to strategically capture data to enhance other experiences and tasks in the most natural way possible. The combination of these experiences collects most relevant data from coaches without additional work—they just proceed as normal through their coaching processes.

The architecture allows for information to be both bound to entities and passed between different experiences within the system—creating incredible efficiencies and offering a level of analysis never seen before.

It should be understood that the present invention may be applied to any number of sports and related activities. However, for purposes here, particular emphasis in the examples is given to football. It is to be understood, however, that the same principles, methods, and systems described with respect to football may be applied or adapted for any number of other sports or related activities and the present invention is not limited to any particular sport. In addition, although emphasis here may be on collegiate athletics, the present invention may be used at any level including youth sports, high school sports, club sports, professional sports, or other levels of sports.

The methods and systems described herein may be implemented using computer programming or engineering techniques including computer software, firmware, hardware or any combination or subset thereof.

Figure 1:
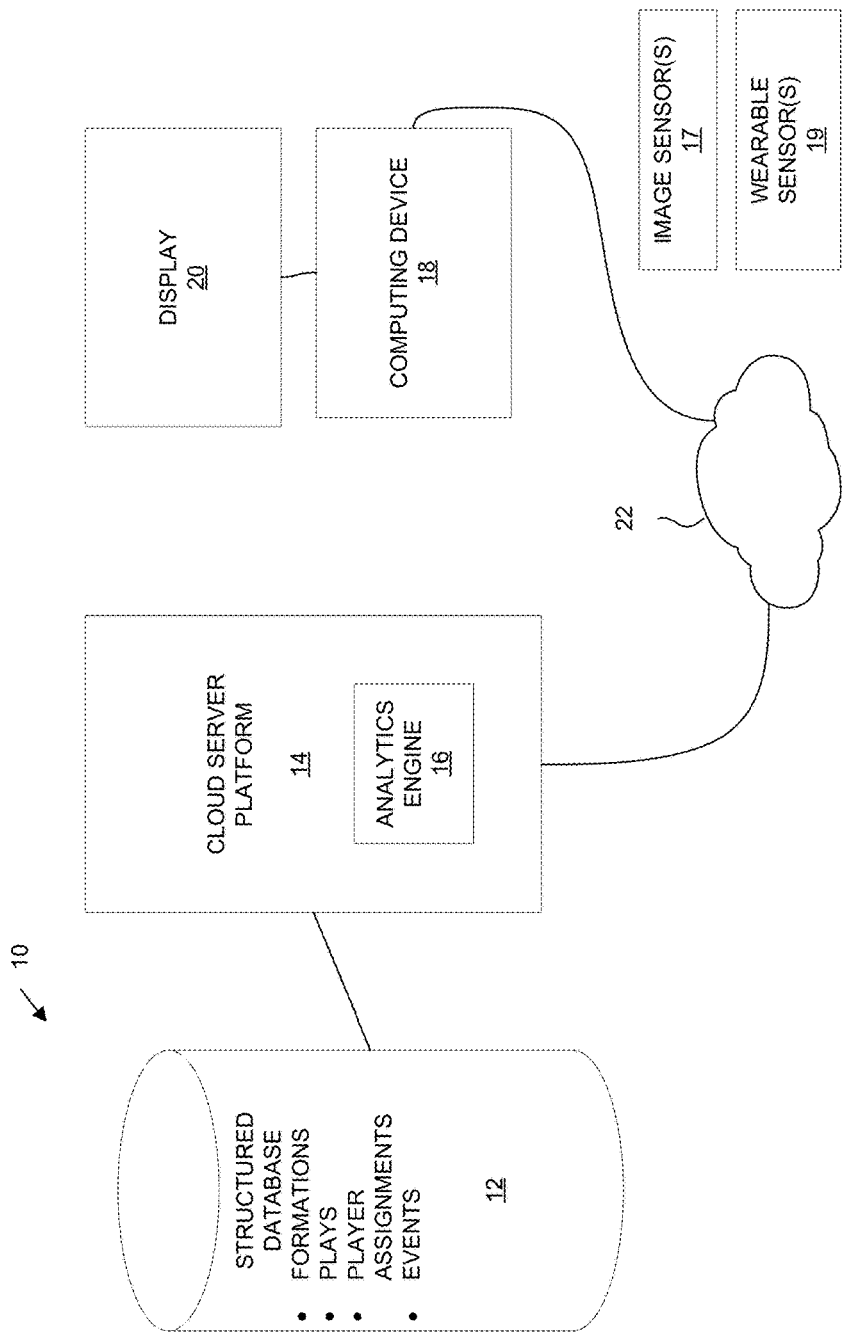
FIG. 1 illustrates one example of an architecture of a system.

FIG. 1 illustrates one example of an architecture of a system 10. As shown in FIG. 1, there is a structured database 12 which may be a relational database. Stored within the database are formations, plays, player assignments, events, and other data as described herein. A cloud server platform 14 is in operative communication with the structured database 12. An analytics engine component may be executed on the cloud server platform 14 for performing analysis of various types and kinds including statistical analysis. A network 22 is shown which is operatively connected between the cloud server platform 14 and a computing device 18. The computing device 18 may be a computer, laptop, tablet, smart phone or other device. A display 20 may be operatively connected to or integrated with the computing device 18. One or more image sensors 17 and one or more wearable sensors 19 are also shown. Examples of such wearable sensors include inertial sensors such as accelerometers for tracking movement of players and/or impact of players with others or with field surfaces, biometric sensors for monitoring physiological state of players, or other types of sensors. The use of video imagery and sensor data in various analyses that may be performed as will be explained later herein.

Figure 2:
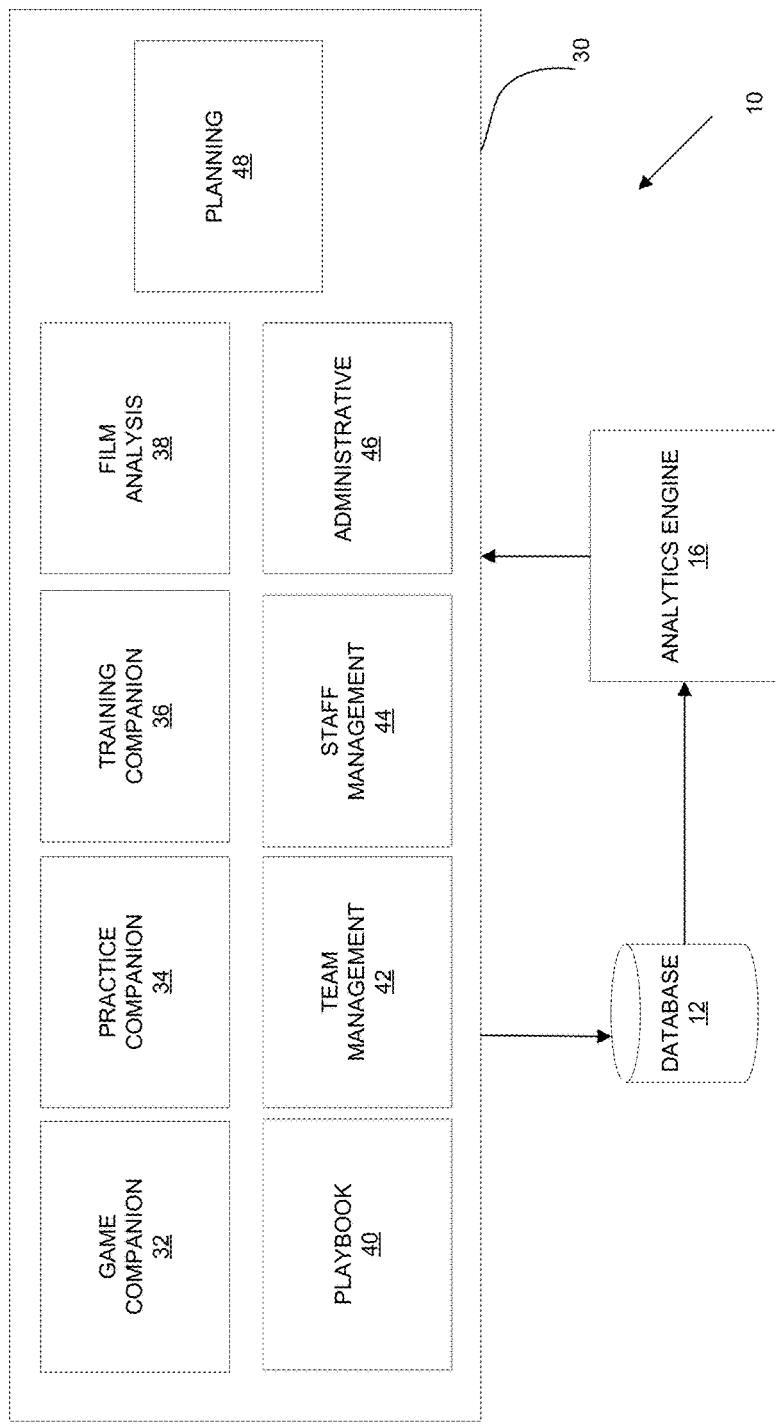
FIG. 2 illustrates another embodiment of a basic architecture for an athletic intelligence system.

FIG. 2 illustrates another embodiment of a basic architecture for an athletic intelligence system 10. The system 10 can include a plurality of different components or experiences 30. This may include a game companion 32, practice companion 34, training companion 36, film analysis 38, playbook 40, team management 42, staff management 44, administrative component 46, and planning component 48. These various components or experiences 30 may be implemented through instructions stored on a non-transitory computer readable storage medium and executed by a computing device. The database 12 may receive data from the various components or experiences 30. Also shown, in FIG. 2 is the analytics engine 16 which may be used to receive data from the database 12 and provide insight to the various different components or experiences 30.

As a part of the system there are three separate companions which may be in the form of companion software applications including mobile apps operating on mobile devices such as tablets or smart phones. The primary purpose of each companion app is to assist coaches in their execution of the activity at hand—by providing their information to them and the ability to collect basic pieces of information while an activity is ongoing. Companion apps will mostly likely be accessed from a mobile device such as a tablet or smartphone and (as with all experiences) may be personalized for the signed in coach/athlete/staff or other user. In one embodiment there are three companion applications—1) Game, 2) Practice, and 3) Training.

Game Companion

The Game Companion 32 may hold all templates, information, notes, and media the coaches leveraged in preparation for the game. It can surface information in real-time—including the opponents favorite scouted plays on $3^{rd}$ and short (when it is $3^{rd}$ and short). Coaches will often want to collect light amounts of data in real-time. Coaches can divide up data collection responsibilities—so staff can begin to scout the opponent—whereas volunteers could collect basic information like down/distance or real-time edit the film—which is all merged together for immediate use by the coach. The companion app may leverage real-time data collection to enhance tools that were previously offline—like the coaches play card—by keeping a tally of how many times plays were called and their effectiveness. In addition, the game companion app can have other useful tools—like a halftime timer to make sure the coach stays on schedule.

Data Collected: Situational (down/distance, quarter, time remaining), play result (yards gained, tackle, etc.), personnel on field, play call, opponent formation I play call, weather, feeling of momentum, etc.

Practice Companion

The practice companion 34 may hold each coach's personal practice schedule—including the drills and scripts he will be running—with a timer to keep practice on time. Coaches can access more information about the drill/script—including lightweight grading or "what to look for" templates of information. Notes and grading can be done throughout practice—then surfaced in other moments of relevance. For example, a player who failed at a technique drill could be flagged to be watched later when a play call asks him to perform that technique. Coaches can collaborate in real-time by indicating if a drill is going well, and clicking a button they are ready to move on to the next drill that all other coaches can see.

Data Collected: Play result (ability to execute plays from game plan), individual player performance, player effort, time necessary for drills, comments, first in line, etc.

Training Companion

The training companion 36 allows athletes and supervising coaches to properly execute and capture data on workouts. Insights can be surfaced to adjust workouts in real-time based on industry best practices combined with personal indicators of the situation. For example, if a player is running with a wearable sensor that tracks heart rate, the system could suggest he slow down if his current heart rate was greater than the targeted personal range.

Data Collected: Workout statistics (weight lifted, reps, run distance/speed, etc.), test results (40 yard dash time, vertical etc.), health indicators (heart rate, etc.), personal measurables (height, weight, etc.), etc.

Film Analysis

The primary purpose of film analysis component 38 is for a coach to deeply analyze what happened during a game or practice. Here, a coach has the benefit of watching plays multiple times so he can review technique and where things went off plan. Film analysis includes basic video editing (dividing the plays into clips, inserting flags/comments, etc.), but primarily focuses on collecting information. Coaches have previously divided up the data gathering requirements—so when a coach enters film, he has a list of cards to collect data points specific to him. As a coach watches the play, he completes the card—which attaches data to that specific play and film clip—along with any other associated data from other coaches, the playbook, and game companion application.

Data Collected: Play result and situational data (what was not captured from game companion), player grades, player performance, opponent weaknesses, opponent formations, opponent plays, etc.

Playbook

The Playbook component 40 acts as a library of all plays available to a coach, and provides substantial detail about them. The coach can simply draw up a play in this experience, and the experience specifically leverages the drawing and conversion of (X, Y) data to athletic entities, as described in the 'Data Collection and Classification Process' of the data flow section. This enables the play to be classified in multiple different categorizations for easier discoverability (ex: play is classified under trips, attack cover 2, pass, mid-level pass, etc.). Results from the play and the situational variables roll back into the play for immediate analysis, additional classification, and connections to opportunities in the game plan (ex: play generates 8 yards against cover 2, vs. 3 yards against cover 3—could be automatically flagged for situations where opponent is likely to be cover 2). Separate playbooks can be maintained for opponents, and coaches can add plays from various sources (news articles, other coaches sharing, etc.) which are compatible with the system by simply clicking a button.

Data Collected: Play, formation, set, personnel, assignments, technique, reads/options, desired opponent offense/defense, targeted opponent player, etc.

Team Management

The Team Management component 42 allows the coach to define, group, and monitor the individual profiles/work of their players. Coaches define what system they run, their player roster, and their depth chart/formation specific subs—enabling coaches/athletes can add additional information about each player. Inputting players in the roster gives them each an account (and collects their personal information)—and player accounts are linked to anytime that player is referenced as an entity—enabling personal feedback automatically.

Data Collected: Depth chart, player positions, player groups, player profiles, system selection, player prototypes, etc.

Staff Management

The Staff Management component 44 allows coaches to define, group, delegate tasks, and monitor the work of their staffs. As coaches are added—this creates an account and positions them as an entity in the system—particularly a resource. Now other coaches can delegate data collection, drill supervision, or other tasks to each other.

Data Collected: Staff specialties, staff tasks, staff performance, etc.

Administrative

The Administrative component 46 is less vital to the Athletic Intelligence System—but enables the coach to more easily handle tasks related to running an athletic team that don't directly relate to strategy. Coaches can leverage common templates to ensure compliance with requirements and easily handle common tasks. Some information may be used to offset risk (ex: coach will receive notification on Practice Companion that player who hasn't signed insurance form cannot participate, etc.)—or automate other tasks (ex: schedule identifies team and automatically connects coaches to enable film sharing, etc.).

Data Collected: Schedule, logistics, captain voting, fundraising, insurance forms, etc.

Planning

The planning component 48 is where coaches turn insight into action. Coaches have their pre-defined weekly templates (with responsibilities divided up amongst the staff)—and populate their plans based on insights that are related to whatever task they are accomplishing in the moment. For example, while putting together a script for $3^{rd}$ and short—an insight could show what the opponent often runs on $3^{rd}$ and short. Similarly, if a coach had to decide what to do with 10 minutes left of practice—insights could come up showing 1) what mistakes players made that need to be corrected and 2) what elements of the game plan had little time allocated to them. Coaches can make changes that update multiple documents from this scenario—and send out updates to all relevant players and staff.

Data Collected: Practice schedule, connection between goal/problem (performance gap) and solution (drills). Development plan, connection between goal/problem (performance gap) and solution (exercises). Player testing scores (measuring understanding of game plans and plays), player feedback to coach, game plan, connection between goal/problem and solution (game tactics), etc.

Although various experiences are described herein, it is to be understood that although what is shown is representative, additional experiences may be added, altered, or combined to enhance the overall coach experiences. The experiences described are selected to provide a natural way to collect data and improve the process from beginning to end. In addition, although various types of data has been described for each of the various experiences, it is to be understood that other types of data associated with each experience may also be collected.

Figure 3:
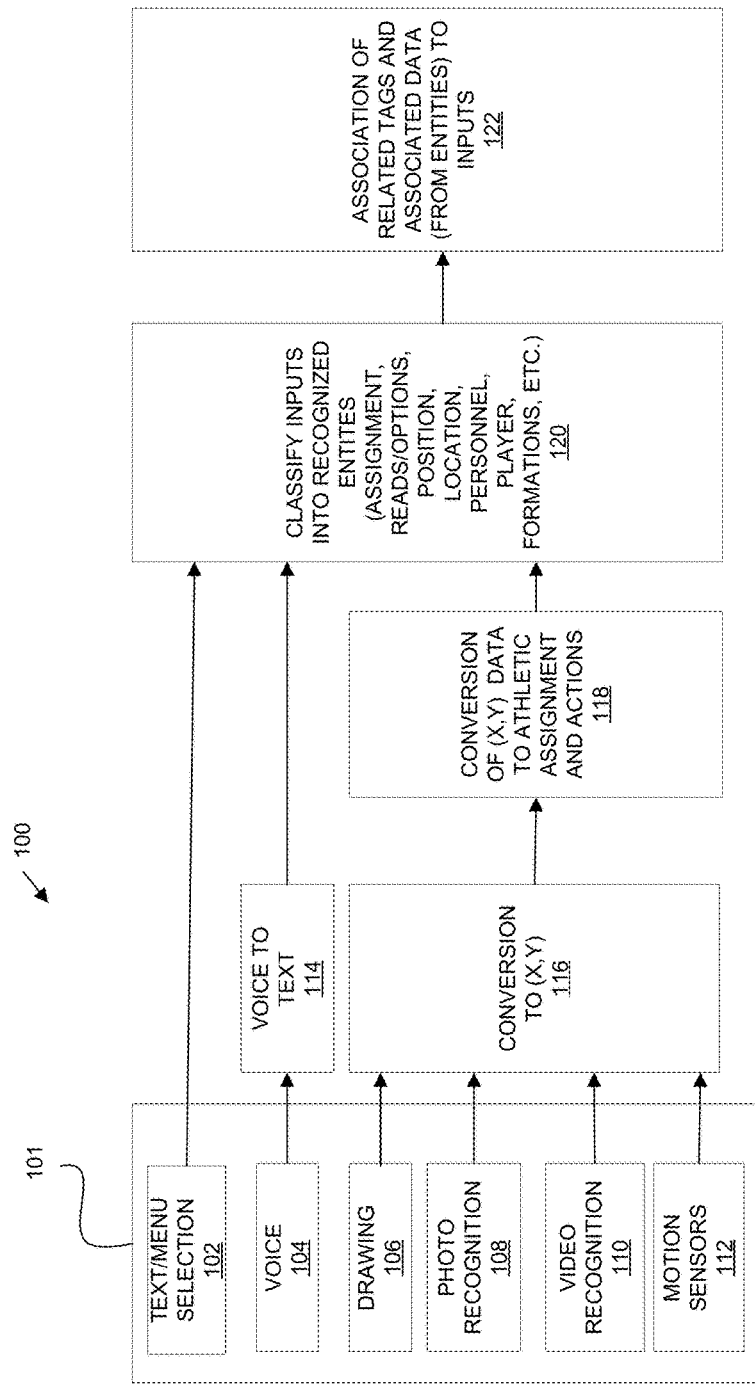
FIG. 3 one example of a methodology.

FIG. 3 one example of a methodology 100. Various natural user inputs 101 are shown. These may include text or menu selection 102, voice input 104, drawing input 106, photo recognition 108, video recognition 110, or motion sensors 112. Depending upon the type of input additional processing may be performed. For example, where voice input 104 is used, the voice input may be converted to text as a part of a voice to text as a part of conversion process in step 114. For user input via drawing 106, photo recognition 108, video recognition 110, or from motion sensors 112 or other wearable sensors or devices the user input may be processed in step 116 to convert the user input to appropriate spatial coordinates such as x and y coordinates. Next in step 118, the spatial coordinate (e.g. X, Y data may be converted to athletic assignments and actions. In step 120 the inputs are classified into recognized entities such as, without limitation, assignment, reads or options, position, location, personnel, player, or formations. Then in step 122 related tags and associated data from the entities are associated with the input data.

According to one aspect a system is provides a digital tool—which works on any type of properly configured and/or connected computing device (PC, smartphone, tablet, etc.). Users engage with a drawing application—which can be set to scale to the playing area (to optimize for visualizing spacing), or non-scale to optimize for viewing.

For this example, we will focus on football. A user generally begins by placing players on the field, simply by clicking their location. As the coach selects the locations, the system may track each player location through their set X, Y coordinates. The system may then classify the placement of the 11 players as a formation—which can be named by the coach or in the system. When the coach saves this play—the formation, personnel, and assignments are saved individually—allowing the coach to be able to speed up subsequent play creation. When creating a new play, simply selecting the formation will populate all the players' positions on the field.

The coach may then select the personnel on the field. He may do this through a menu or selection experience, but the system can also leverage the "field zones" from the formation process to make an assumption. In the specific field zones (relative to the position of the ball), the system can automatically assign the players and use rules to identify specific positions. For example, in the RB zone—generally with 2 running backs—the player closer to the line of scrimmage is a fullback. All assumptions can be overridden by the coach, but in most cases it will heavily speed up the process.

Figure 4:
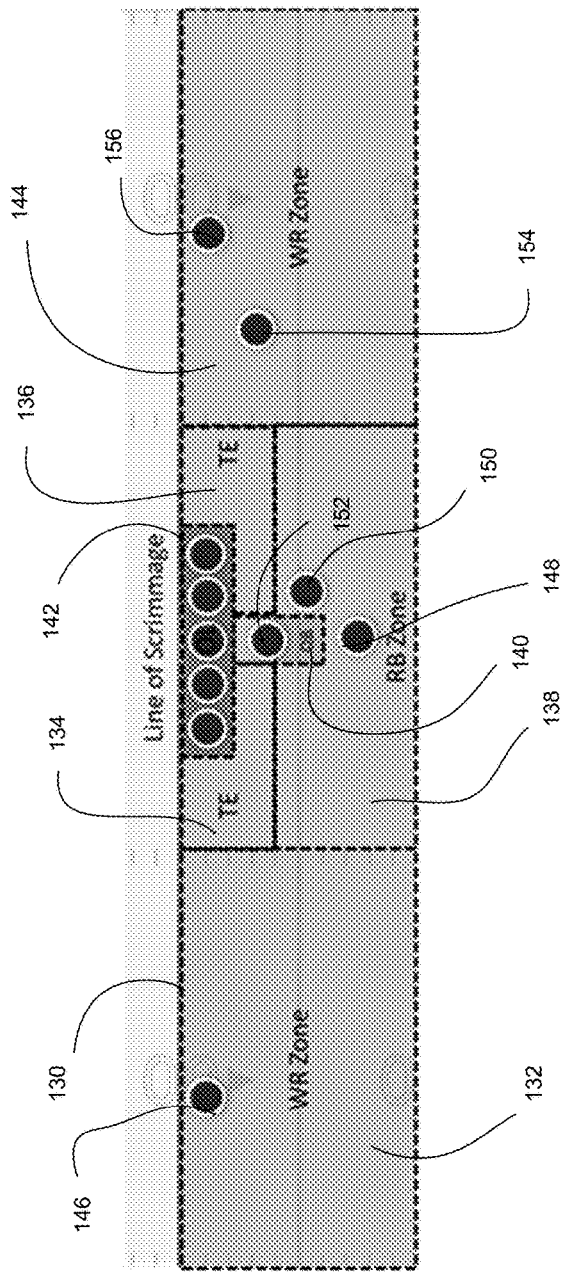
FIG. 4 illustrates a further example showing a football field.

FIG. 4 illustrates a further example. A portion of a football field is shown. A line of scrimmage 130 is shown which extends across the football field. Different zones are provided which are associated with different players' positions. These include a wide receiver zone 132, a tight end zone 134, another tight end zone 136, a running back zone 138, a quarterback zone 140 (in which the quarterback 150 is located), an offensive line zone 142, and a another wide receiver zone 144. In this specific example above, the placement of the players in the field indicates 20 personnel (two running backs 148, 150, zero tight ends)—which implies three wide receivers—currently split one to the left 146 and two to the right 154, 156. With the location of doubles to the right, the backfield is in a Strong I—with the fullback 150 offset towards the formation strength. With the coach simply placing players on the field, we can leverage assumptions to tag this formation with:

Personnel—20
Formation Strength—Right
Alignment—1×2
Balanced—No
Line Shift—No
Backfield Count—2
Backfield Strength—Right
Backfield—IN
Left End—Split
Right End—Split
Line Splits—Normal
Unbalanced Line—No
QB—Under Center
Formation Group—3 Wide
Z Split—N
X Split—N
F Split—I
TE Location—None
Set—None Note that in applying these tags to this formation, the field zones may be used to identify the player positions.

Understanding the roster positions of the players on the field also empowers the system to connect with the depth chart, then project who would be on the field when the play is called. This speeds up processes in other coaching tools and enables additional analytical techniques. For example, identifying the starting running back and his speed could indicate a mismatch exists against an opponent player—which may be visually displayed on the play card during preparation for the opponent. Another example, the player information may be passed along to a film analysis application when the play is called. This would enable a player to watch all the plays where he was on the field, immediately. Or it could enable the coach to know who is on the field for grading and sharing information with players.

Figure 5:
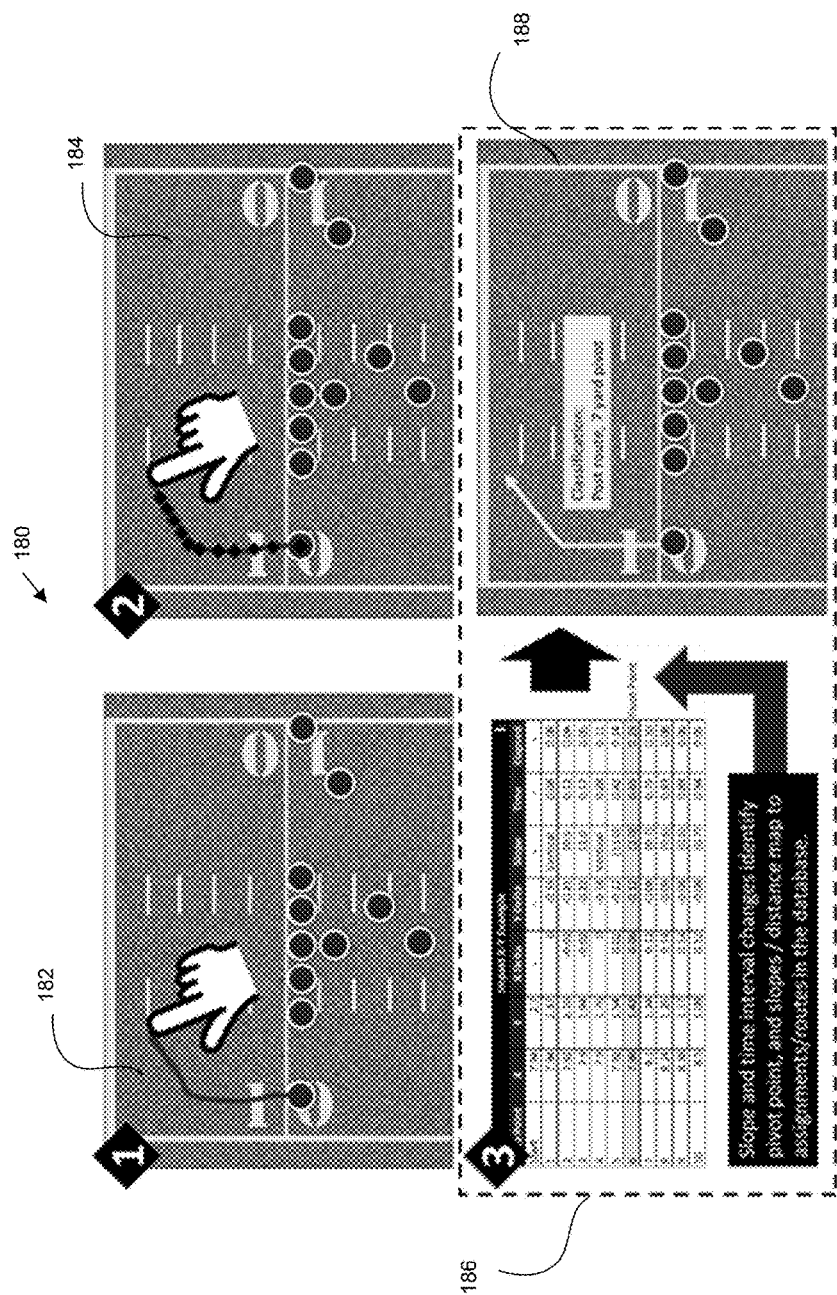
FIG. 5 illustrates one example of a process of receiving user input in the form of hand-drawn information.

To complete the play creation, the coach must express the assignments of the players on the field. This may be performed through a combination of drawing and menus. The coach often just draws the assignment for players—either indicating who they are supposed to block, or where they are supposed to go. FIG. 5 illustrates one example of this process 180. In step 182, as the coach draws, the system collects the X, Y coordinates and time stamps instantly in step 184. The most important parts of pass routes are the pivot points and angle at which the receiver runs after pivoting. The system analyzes the slope change alongside the time stamp between points (users tend to slow down their drawing speed when approaching a pivot point) to determine the pivot point—and then uses the slope to determine the route as shown in step 186. The user can easily adjust the pivot point up or down, or click on the route to see a modified list of similar routes they can select. Thus, instead of a rough hand drawn route input by the user in step 182, a clean route is produced in step 188 which in this example, includes a first line segment from the player's initial position to the pivot point and then another line segment from the pivot point which extends at the angle which the receiver is to run after pivoting.

Thus, user drawn input describing a player assignment is received at a computing device. While receiving the user drawn input slope changes of the user drawn input and time interval changes of the user drawn input are monitoring. The slope changes of the user drawn input and the time interval changes of the user drawn input are used by the computing device to identify a pivot point associated with the player assignment. Then the user drawn input is re-drawn using the pivot point, slopes of the user drawn input and distances associated with the user drawn input.

After completing this process, a coach has now created a play in his system. However, he has also created or associated multiple entities to this play. He's expressed a formation entity—which is the combination of the 11 player locations pre-snap. He's expressed a personnel grouping for this play—which consists of which roster positions should be on the field. That information can connect to his depth chart—which can make an assumption about the 11 actual players on the field. He's also expressed 11 assignments for the players. Groups of similar player assignments can be rolled up in another entity—for example—all blocking players can be classified as the "protection." All of this information is available in his libraries as entities. Anytime the coach calls these plays or references these plays, he's also referencing and generating data about these other entities. This information will be vital for analysis as we move forward.

In the end, the coach has completed the data collection and classification process, simply by drawing as he would for any other drawing application. The conversion to structured data and appropriate classifications are completed for him automatically by the system (although he can manually adjust and add any classifications himself). This application can stand alone, or the data can be integrated with other data from the Athletic Intelligence System—to be both delivered as insights to aid in decision making or to speed up other processes.

Figure 6:
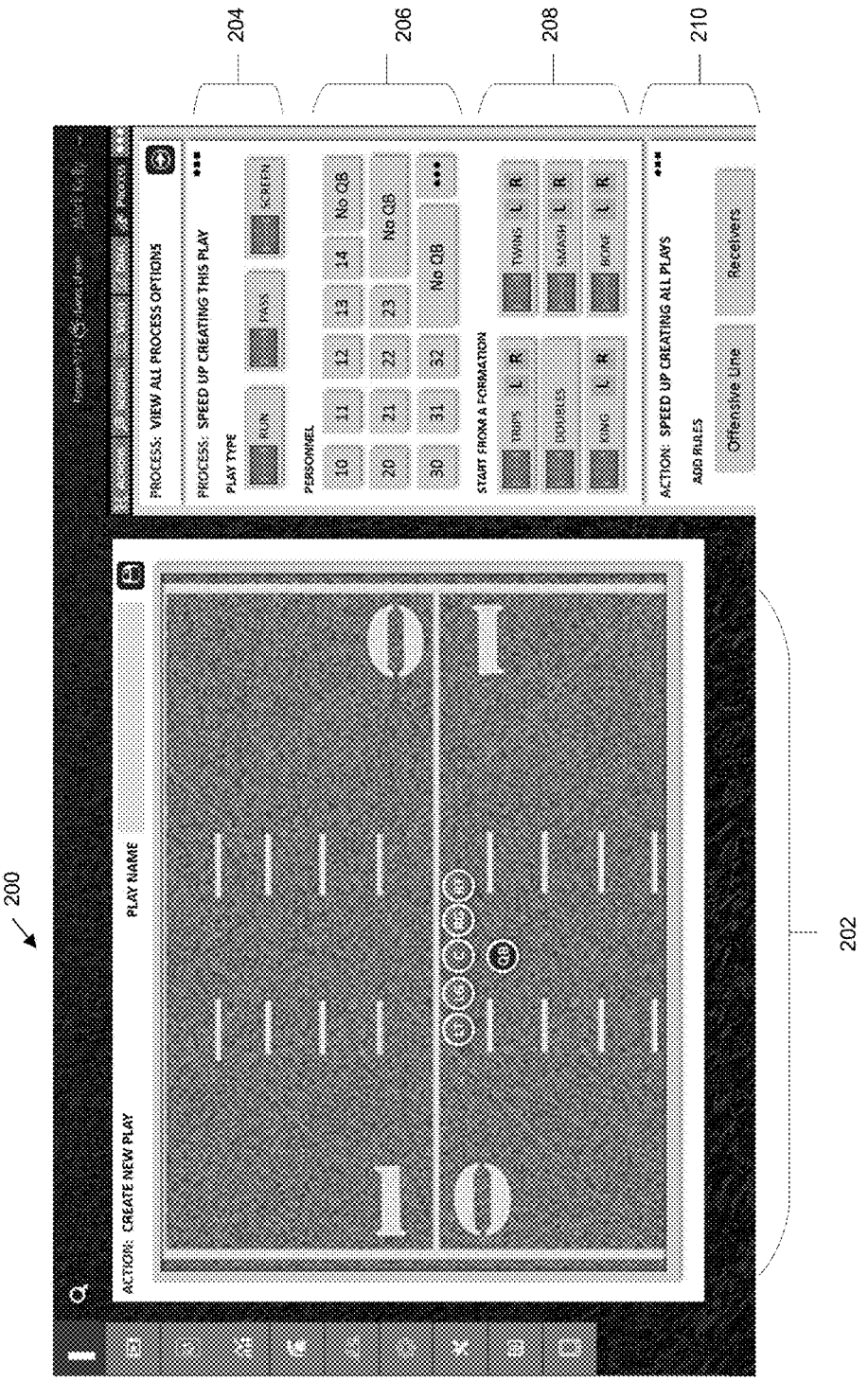
FIG. 6 is a screen display illustrating the process of creating a new play.

FIGS. 6-13 provide a further illustration of creating a new play. FIG. 6 shows a screen display 200 which includes a portion of the football field 202. To assist in creating the play the user can select a type of play 204. Examples of types of play may include a run, a pass, or a screen. Of course, other types of plays may also be present. The user can also select the personnel 206. Examples of possible selections may be 10, 11, 12, 13, 14, no quarterback; 20, 21, 22, 23, no quarterback; and 30, 31, 32, no quarterback. In this nomenclature, the first digit may indicate the number of running backs and the second digit may indicate the number of tight ends. Other selections for the personnel may also be present. Also to assist in creating the play, the user may select the formation to start from 208. In addition, the user may add rules 210 to speed up creating plays. Although the various selections discussed may be used to position players on the field 202, the user may further adjust the positions of players on the field 202 as desired.

Figure 7:
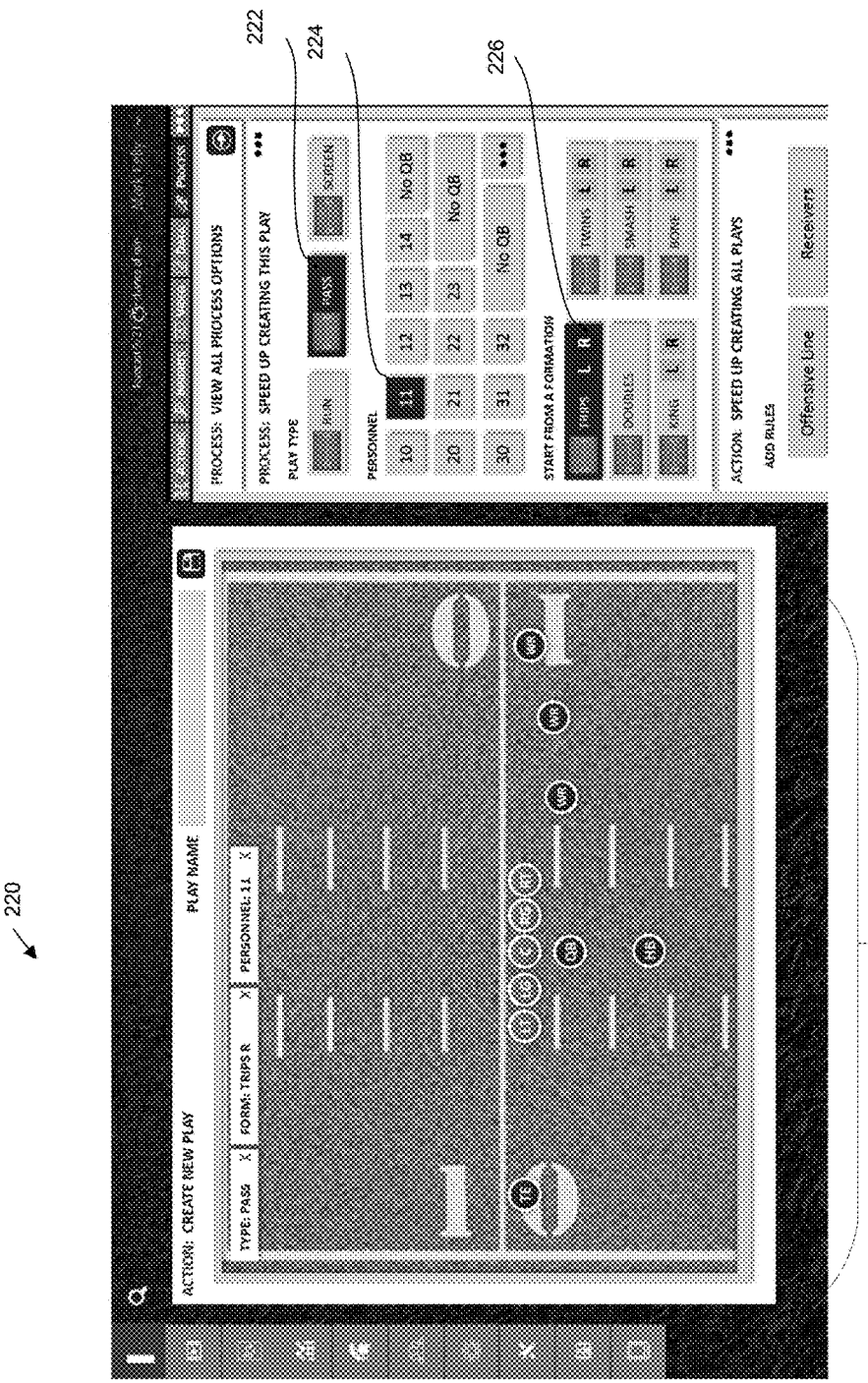
FIG. 7 is a further screen display illustrating the process of creating a new play.

FIG. 7 shows a screen display 220 where a user has selected a play type of "PASS" 222 and a personnel of "11" 224. Note that players have been positioned on the field 228 consistent with these selections. In addition, these selections may be used as tags.

Figure 8:
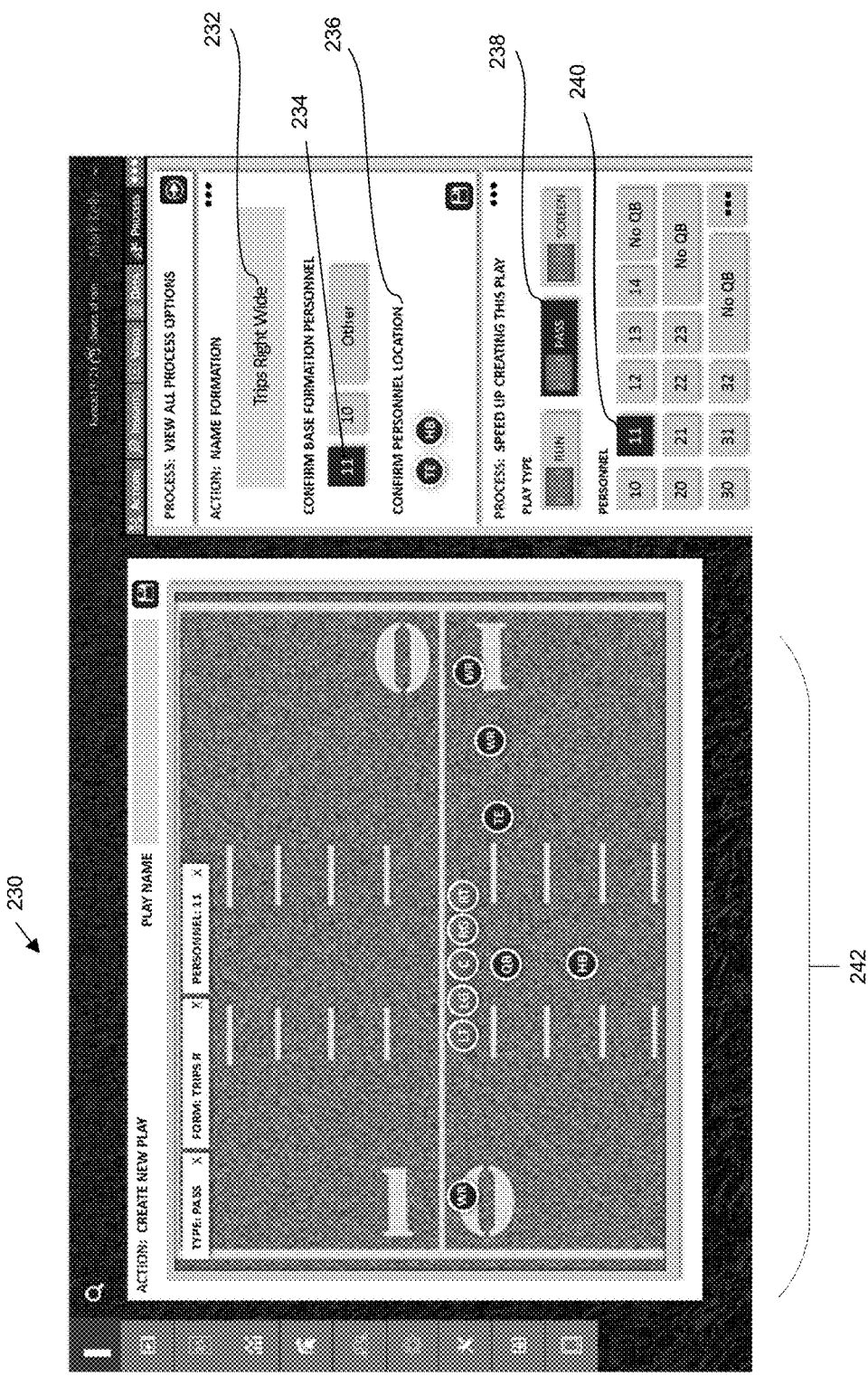
FIG. 8 is a further screen display illustrating the process of creating a new play.

FIG. 8 shows a screen display 230. The formation may be named with a formation name 232. The base formation 234 may be confirmed and the personnel location may be confirmed 236 for particular player positions. The type of play, "PASS" 238 is shown as well as the personnel "11" 240. The players are shown positioned on the field 242 according to the selections made.

Figure 9:
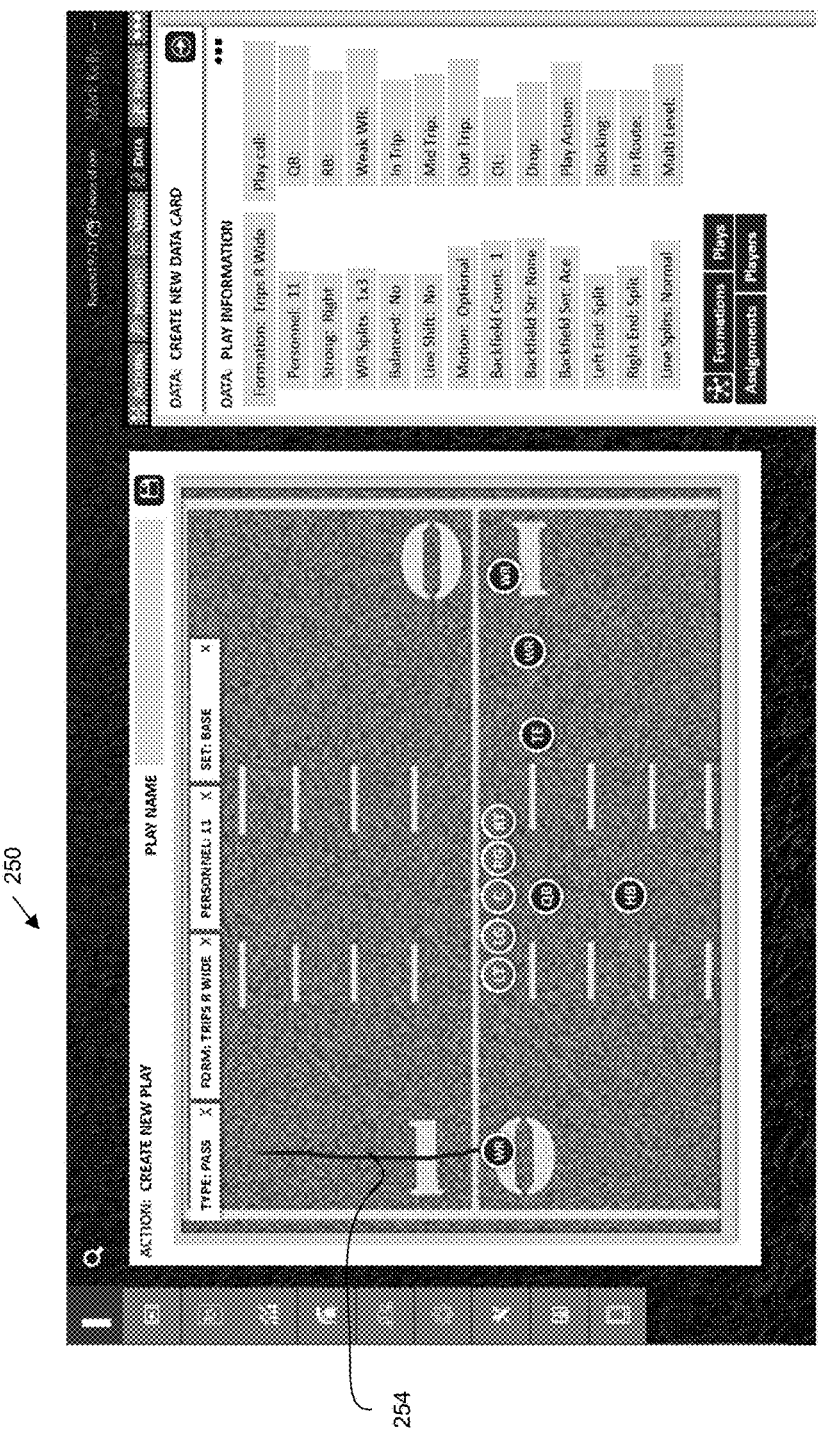
FIG. 9 is a further screen display illustrating the process of creating a new play.

FIG. 9 shows a screen display 250 with a field 252. Now that the formation has been determined additional play information may be input such as receive route information. One example of a receiver route 245 is shown. Note that the route shown is a hand drawn route such as a user may input via a touch interface or using a mouse or other input device.

Figure 10:
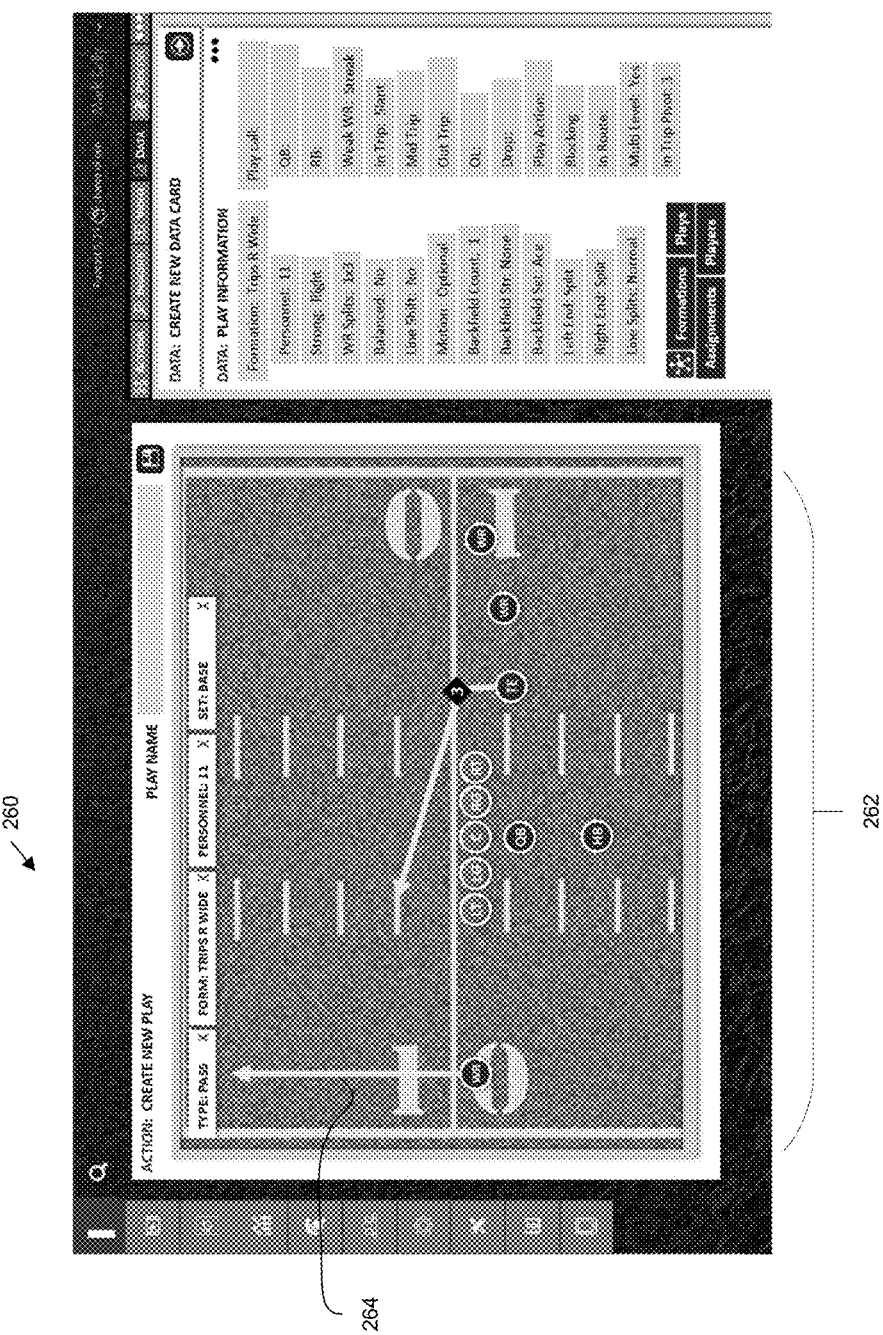
FIG. 10 is a further screen display illustrating the process of creating a new play.

FIG. 10 shows a screen display 260 with a field 262. Note that the methodology of the present invention has been applied to transform the hand drawn route to a clean route 264, in this instance formed of a line which ends with an arrow showing the direction of travel. An additional route is also shown. Also, the route or player assignment originally drawn by the user has been classified. In this instance, a wide receiver route has been classified as a "STREAK" route.

Figure 11:
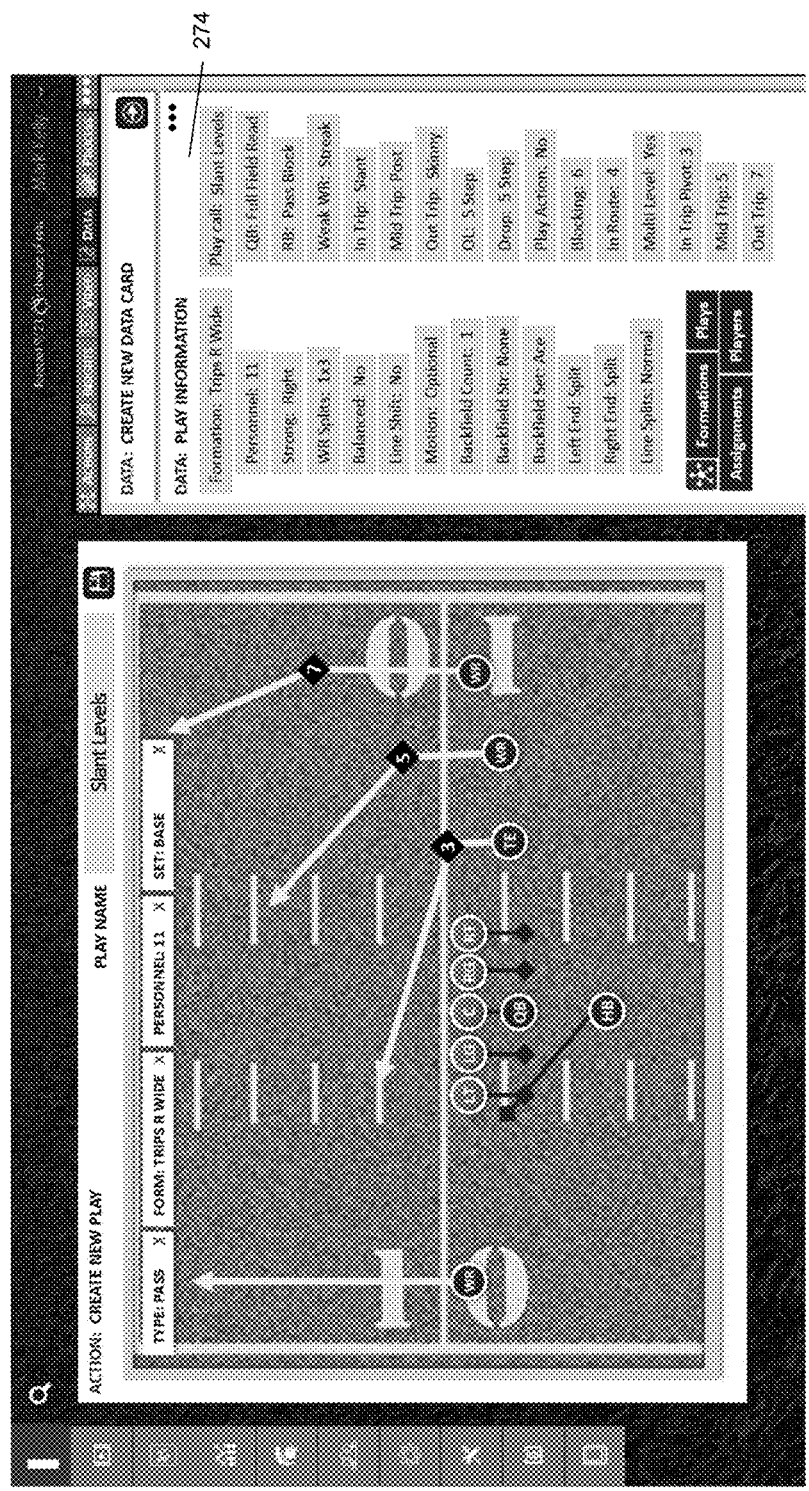
FIG. 11 is a further screen display illustrating the process of creating a new play.

FIG. 11 shows a screen display 270 with a field 272. As shown in FIG. 10, assignments for the players including route information and blocking assignments are provided. To the right of the field 272 various play information is shown for both the formation and the play call.

Figure 12:
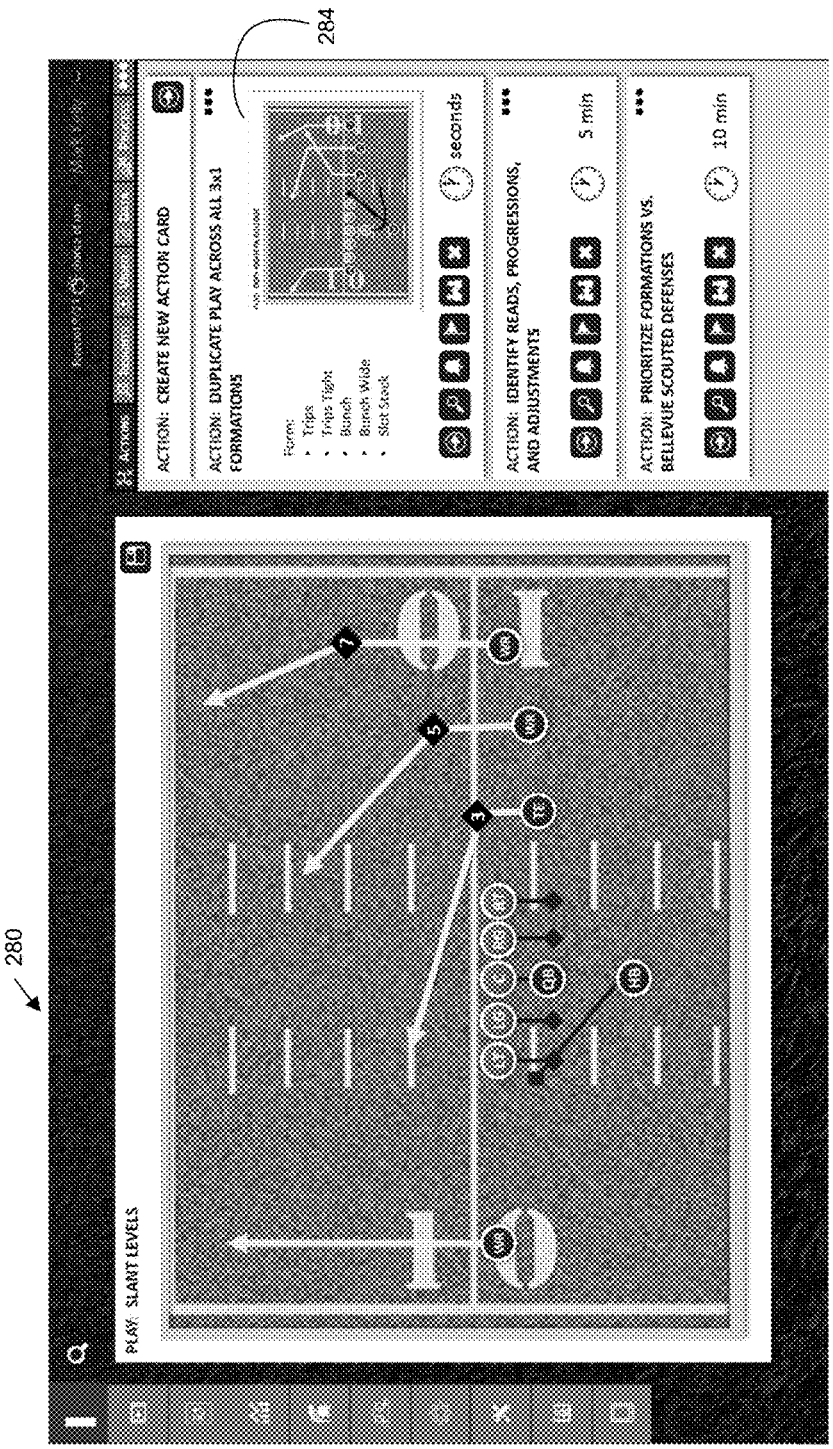
FIG. 12 is a further screen display illustrating the process of creating a new play.

FIG. 12 shows a screen display 280 with a field 284. As shown in FIG. 12, assignments for the players are provided showing a complete play. To the right an option to take an action 284 to duplicate the play across all 3×1 formations is provided. Often coaches will use the same play but run from a different formation. This option allows a coach to very quickly create additional plays without needing to repeat the effort of re-creating the play for a different formation.

Figure 13:
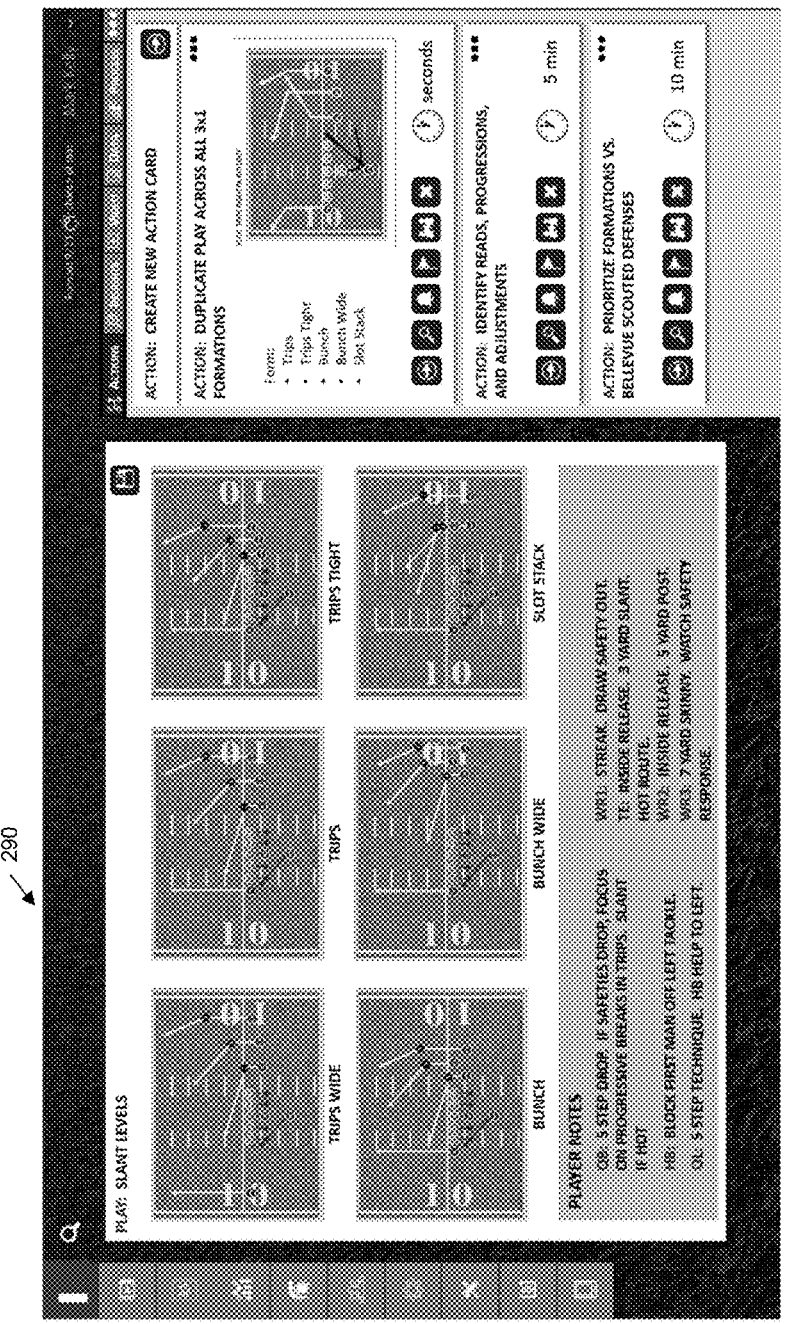
FIG. 13 is a further screen display illustrating the process of creating a new play.

With the structured database, the Intelligent Playbook saves entities separately and recognizes similar characteristics—which enables coaches to save steps when creating variations of plays. For example, the coach has created a play called Slant Levels out of a Trips Open formation. The system gives him the option to duplicate that play call across all similar formations by clicking a button. The system maps the assignment data to the correct personnel and their placement in the other formations—creating several versions automatically. FIG. 13 shows a screen display 290 which includes a set of plays 292 created from the duplication step shown in FIG. 11. The routes for the receivers are shown for a play called "SLANT LEVELS." Thus multiple variations of plays may be created instantly.

The data collection and classification process described above is one aspect of a system which may also provide for data integration and analysis as well as data prioritization, delivery, mobilization, and storage.

With a detailed understanding of each play in a structured database, and additional performance data brought in from the Athletic Intelligence System (or other data sources), the Intelligent Playbook application makes several processes more efficient and enables better analysis. One such example as previously explained is the ability to instantly create multiple variations of plays.

Another feature allows for drawing search/filters or instant recognition of previously drawn plays. With the structured database, the Intelligent Playbook saves entities separately and recognizes similar characteristics—which can be used in a search application. With the ability to convert drawings to structured data immediately—the system enables queries that are actually drawn—rather than typed.

For example, as a coach draws or enters information about a play, the system filters his existing plays based on what he enters. For example, if a coach is identifying an opponent play they ran during a game—he may not know if he's already drawn this play. He can just start to draw—and the system surfaces similar plays they've run in that situation—so he can select the appropriate play, speeding up his time and understanding trends of how often that play is called.

Figure 14:
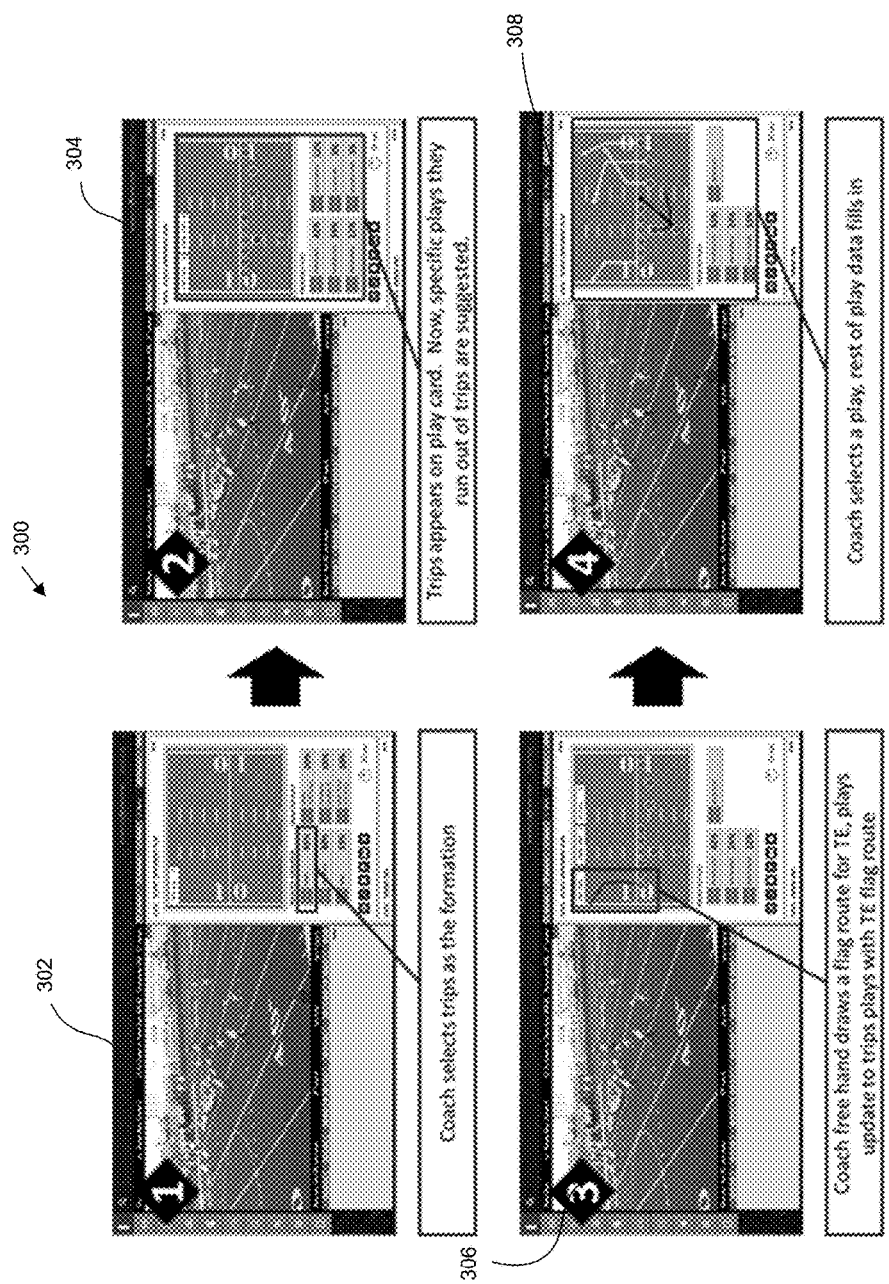
FIG. 14 illustrates one example of such a method where hand drawn routes are input.

FIG. 14 illustrates one example of such a method 300. In step 302, a coach selects trips as the formation. In step 304, trips appears on a play card. Now specific plays which are run out of the trips formation are suggested. In step 306, the coach free hand draws a flag route for the tight end (TE) and the plays which are shown are updated to only the trips plays where the TE runs a flag route. Note that the particular route may be identified based on the hand drawn route in the manner previously described. Then in step 308, the coach may select the play and rest of the play data associated with that play fills in such as route information for other receivers, blocking and other assignments, etc. Thus, in the example shown in FIG. 14, the drawing search/filters allows for instant recognition of previously drawn plays.

Another benefit is the ability associate play data to film, data to play, and/or analytics. In the scenario above, the coach is describing information in a film analysis setting. When he tags the play to the event (ex: Play #3 in our November $3^{rd}$ game), all of the play result data is now associated with the play. This yields several benefits:

- If he has film associated with data about yards gained, he can now understand the effectiveness of specific plays (ex: this play runs for 6 yards per attempt, and gains over 3 yards 80% of time)
- If he associates scouted opponent plays, he can now understand how his play performs against various defenses (ex: against Cover 2 we complete only 40% of passes, but against Cover 3 we complete 70% of passes)
- However, because of the deep understanding of the play—the system can bring him better details on why something is working. For example, the system can look across plays and see what similar types of protection exist. Now, a coach can understand the specific driver of multiple plays performance (ex: this protection works against this blitz 82% of the time, and when it fails, it's off the right side).
- The data from the play is also now associated with the film clips. This enables creation of customized playlists immediately. For example, a coach could be interested in watching "every play where my right tackle is seal blocking"—and instantly have that video and associated data.
- When combining scouted play calls with situational data, one can start to understand when the opponent likes to call certain plays. This insight can be leveraged in a variety of different ways—including creating better scouting reports, predictive scripting (getting the right matchups in practice to prepare for the game), and even real time prediction in the game.

According to another aspect, macro data analysis and play improvement suggestions may be provided. The system may be deployed across multiple teams. With the way the data is collected at a macro level, the system is able to recognize if the same play (or slight variations) are used by multiple teams. In this scenario, there may be insights from a macro data set that can benefit all teams—without giving away the private information of any.

For example, 800 teams may run a power blast play off the right tackle. However, 400 may run it with a TE on the line of scrimmage and 400 may run it with the TE lined up as a wing. The playbook system may analyze which works better—and suggest the change for all coaches. If they accept, the play may be changed with one click rather than redrawn.

The macro data analysis may be performed with any number of statistical techniques. With the structured database, the ability to perform macro data analysis is simplified.

Another feature of the playbook is a playbook translator. When players transition to the next level (HS to college, or college to professional), both coaching staffs have a vested interest in seeing that player succeed. One challenge is the new terminology from a new system. If both teams use the Intelligent Playbook application, it can be the translator. The system can show a player what his previous terminology is now called—speeding up his learning curve. This may be performed by mapping the terminology used by the old team with the terminology used by the new team. The structured database provides for objective descriptions of plays and assignments and thus can map play names between different systems, highlight assignment differences on similar plays, or otherwise emphasize similarities and/or differences between the playbook of the old team and the playbook of the new team.

Yet another feature of the playbook relates to faster grading. Grading players is complicated. It requires understanding of the player assignment, having a checklist of proper technique, responding to reads/options, and watching the film while completing the checklist.

Figure 15:
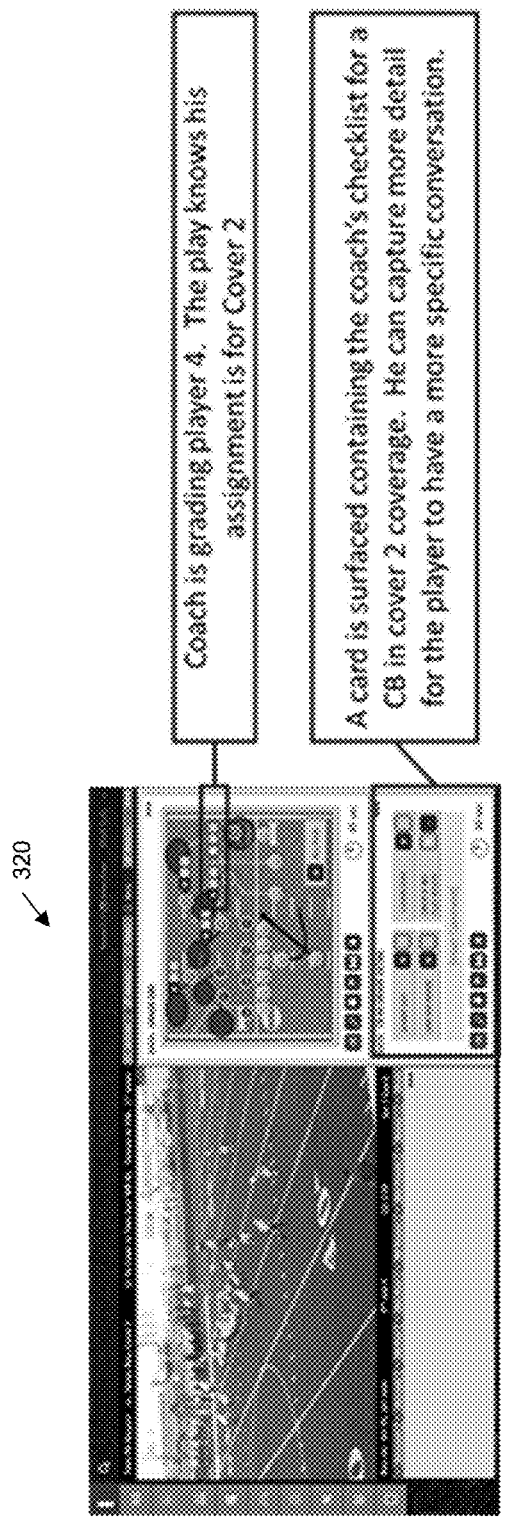
FIG. 15 illustrates a screen display which may be used for grading.

With the system's ability to identify similar assignments across plays and map them to a specific player, the system can now automatically surface the correct grading checklist for every player in the moment of watching film. FIG. 15 illustrates a screen display which may be used for grading. A player may be selected to grade. In this example, the coach may be grading player 4 and the player may know that his assignment is for Cover 2. Note that as shown in FIG. 15, film for a play may be shown to the left and the play card may be shown at the right. A card may be surfaced containing the coach's checklist for a cornerback (CB) in cover 2 coverage. The coach may capture more detail for the player in order to have a more specific conversation with the player.

Figure 16:
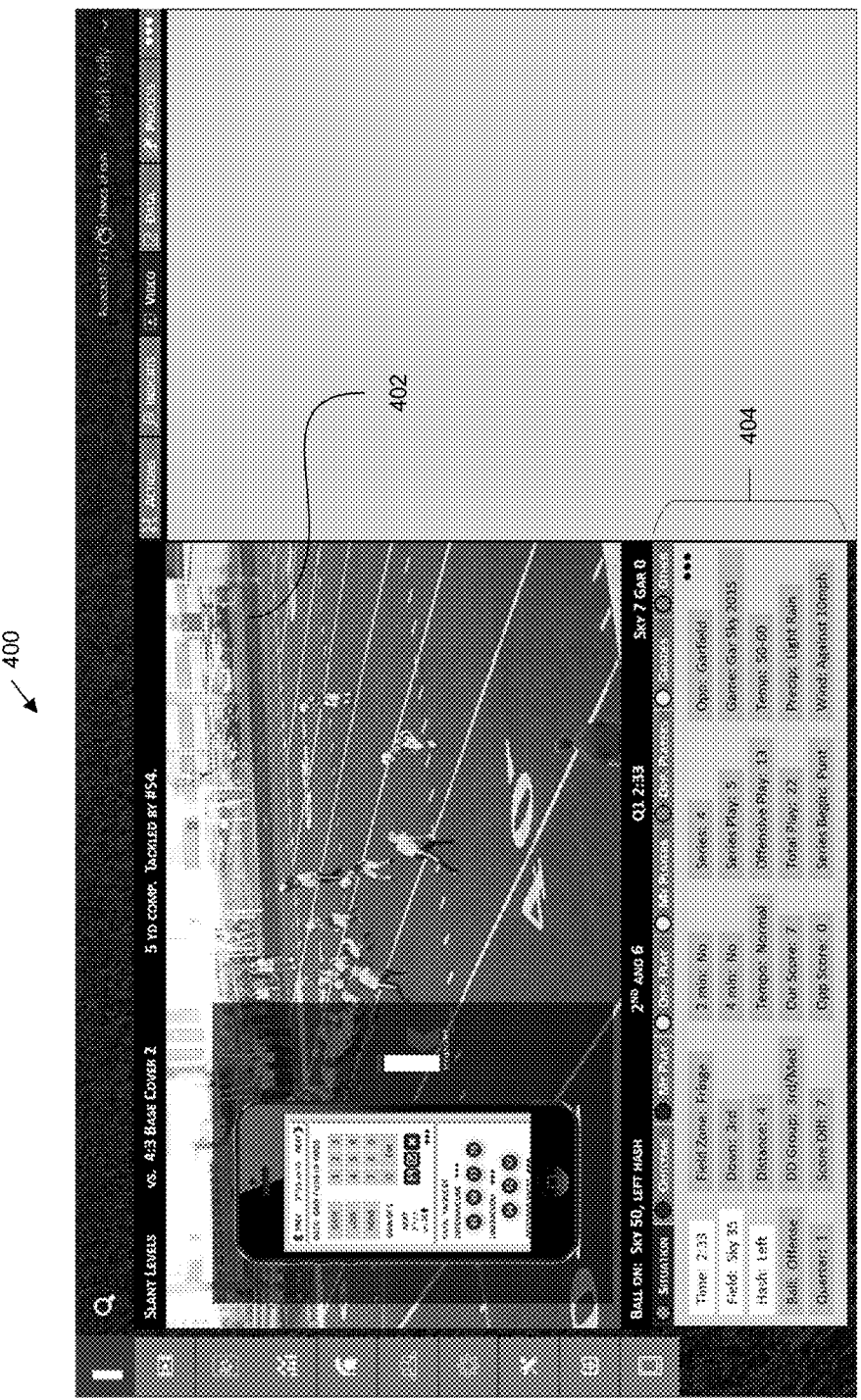
FIG. 16 illustrates bringing companion data into film.

FIGS. 16-19 illustrate bringing companion data into film. As shown in FIG. 16, a screen display 400 is provided. As previously explained, companion data may be collected by volunteers or others with basic information about the plays and may be collected with a mobile device. This may be combined with video 402. Data 404 from the companion app or otherwise acquired may be tagged to the video 402. The Data shown includes situation data such as the time, the spot on the field, the hash mark, who has the ball, the quarter, the field zone, the down, distance, DD Group, score difference, tempo, score, series, series play, offensive plays, total plays, how the series began, who the opponent is, the name of the game, the temperature, precipitation, other weather, or other information.

Figure 17:
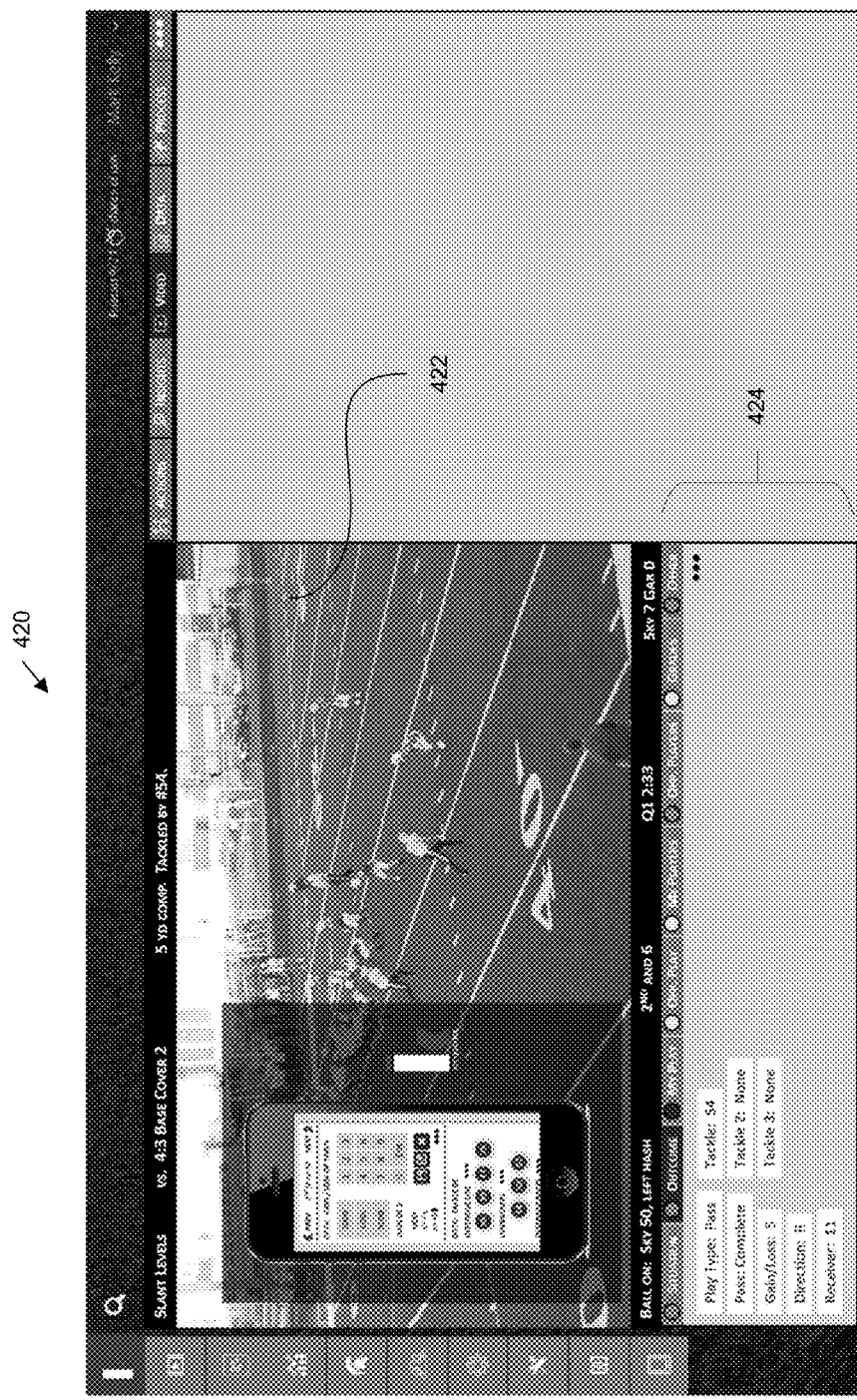
FIG. 17 further illustrates bringing companion data into film.
Figure 18:
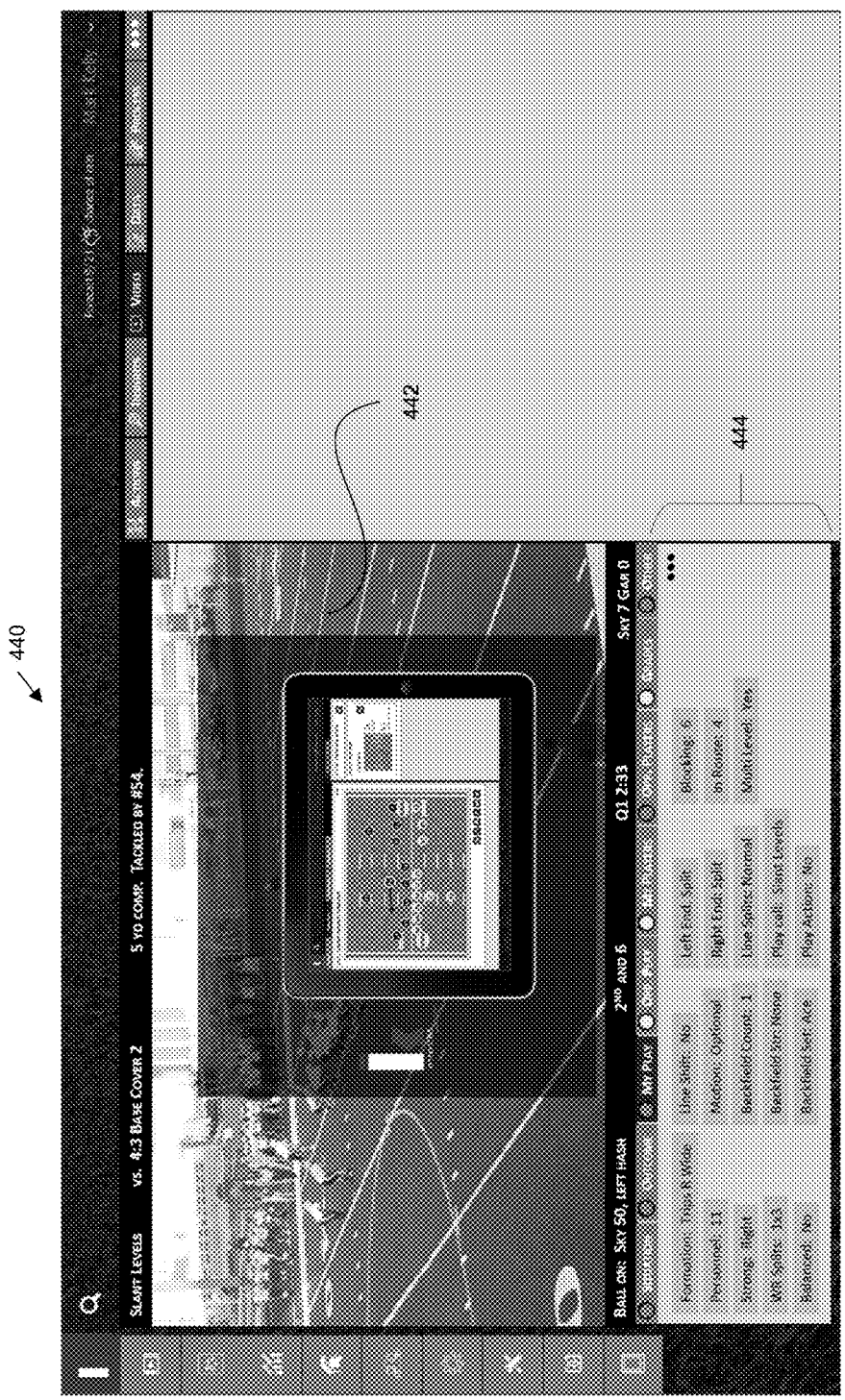
FIG. 18 further illustrates bringing companion data into film.

FIG. 17 shows another screen display 420 and how data from the companion app collected with a mobile device may be combined with video 422. Here outcome data 424 is shown which may include information such as the play type, the result, the gain/loss, the direction, the receiver, who made the tackle or other information FIG. 18 shows another screen display 440. As shown in FIG. 18, real-time coach data may be combined. Here the data 444 may be the data used to describe the coach's play.

Figure 19:
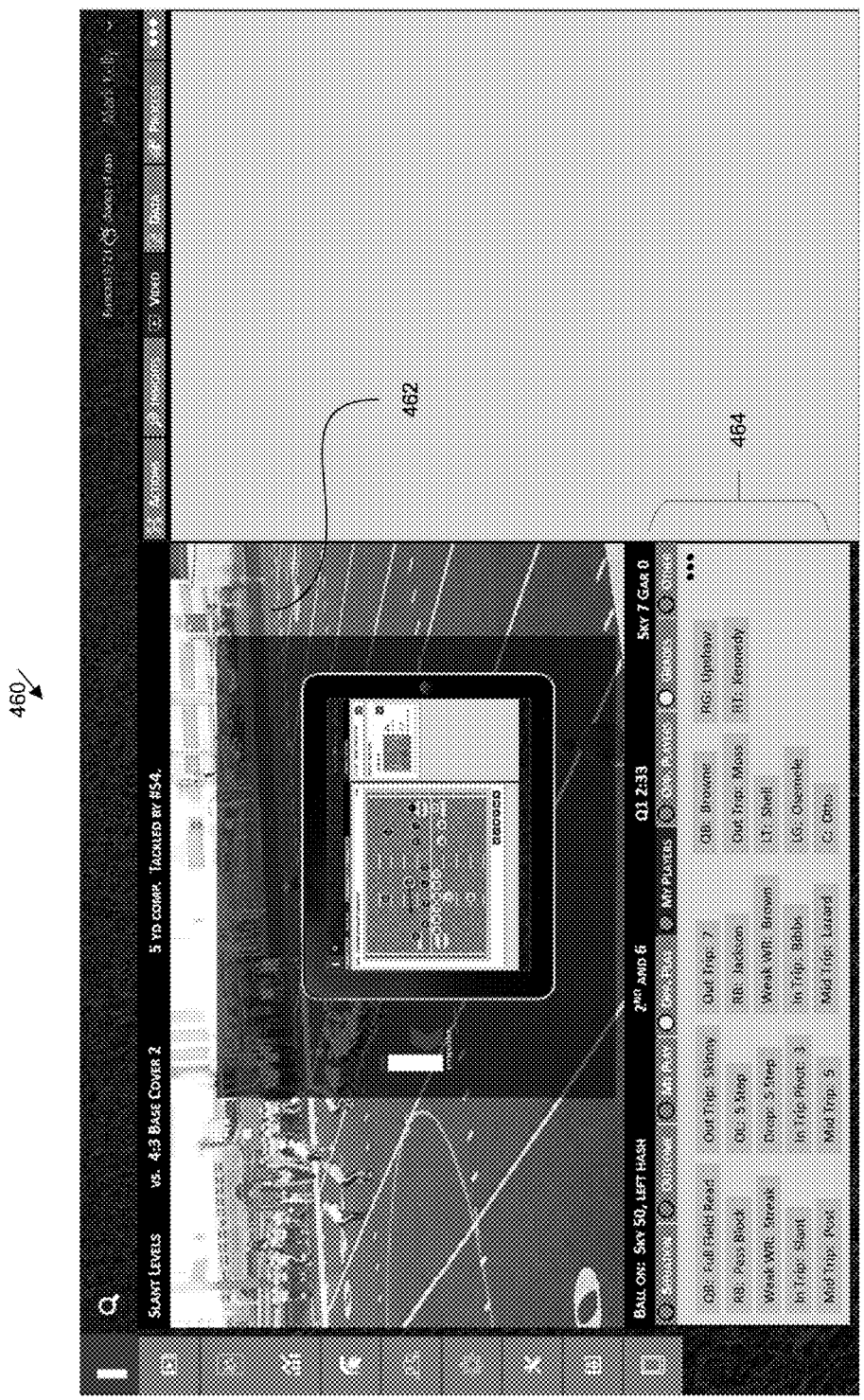
FIG. 19 further illustrates bringing companion data into film.

FIG. 19 shows another screen display 450. As shown in FIG. 19, real-time coach data may include information about the players including assignment information and player names.

Thus, it should be apparent that data collected via a companion app may be made available to a coach in real-time to assist the coach.

Figure 20:
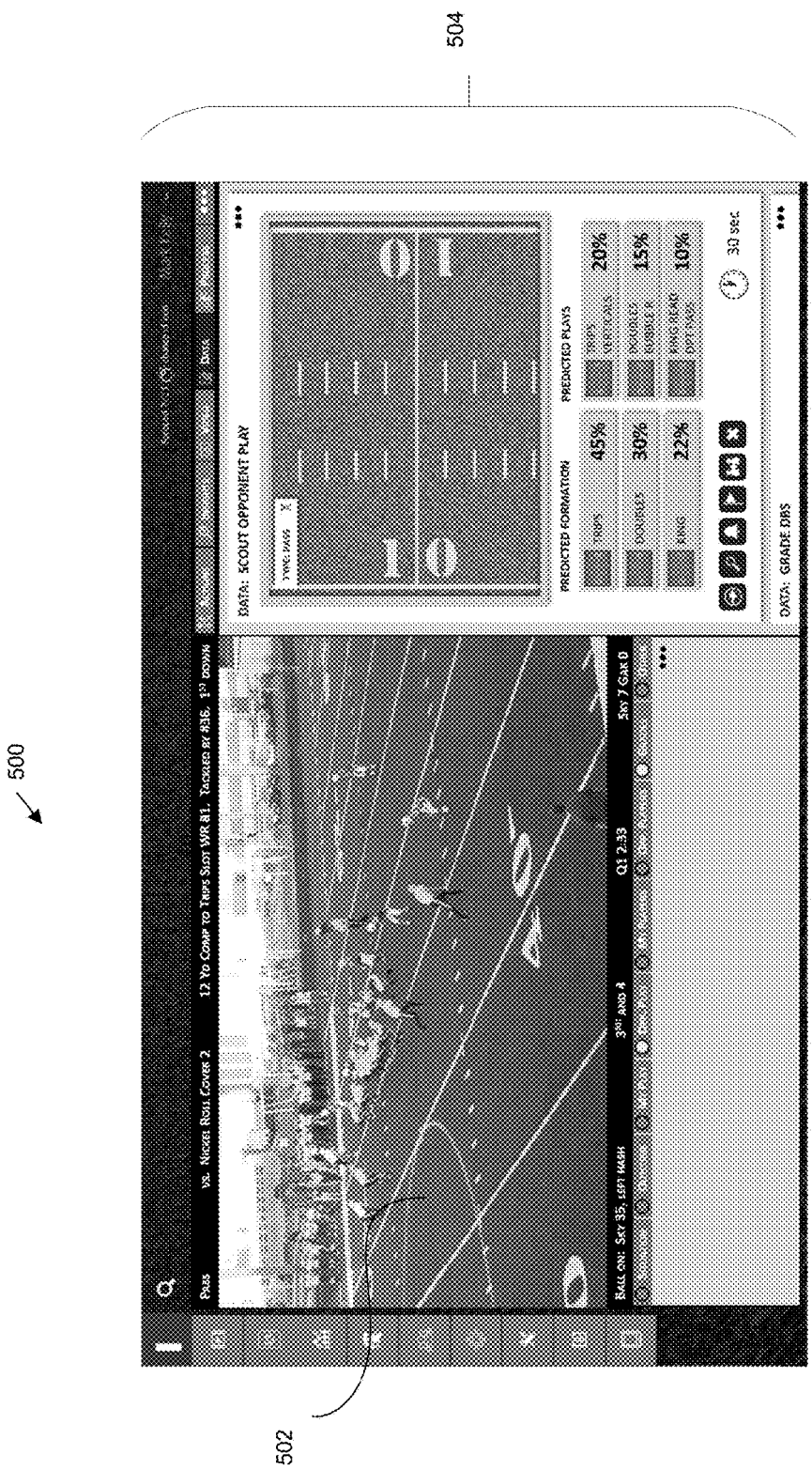
FIG. 20 is a screen display illustrating an example of film analysis.

FIGS. 20-24 illustrate an example of film analysis. In FIG. 20 a screen display 500 is shown. Presented on the screen display is video 502 of a play. To the right is a view of data 504 which includes a display of a field, predicted formations and predicted plays.

Figure 21:
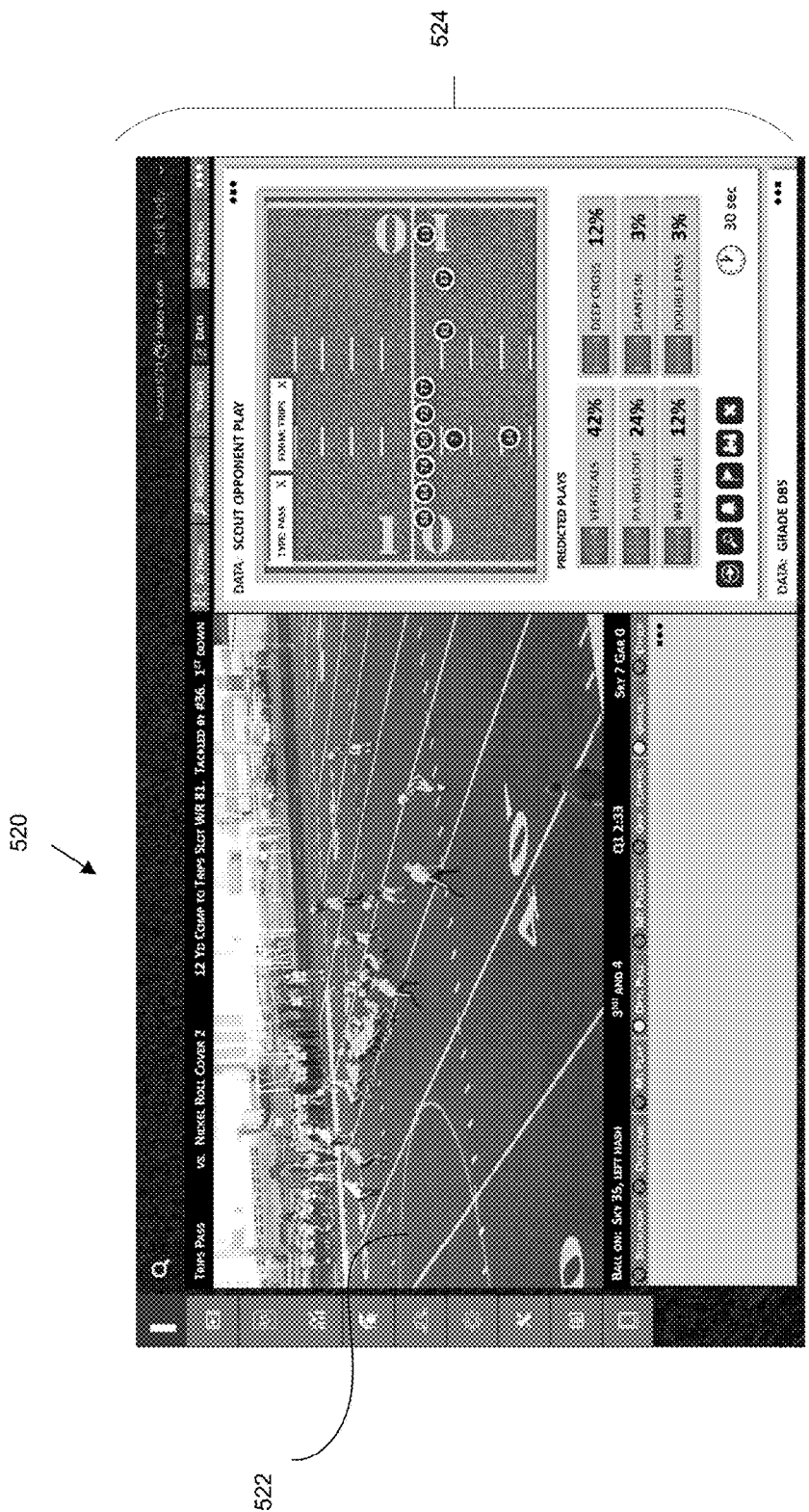
FIG. 21 is another screen display illustrating an example of film analysis.

In FIG. 21 a screen display 520 is shown. Presented on the screen display is a video 522 of a play. To the right is a view of data associated with the play which includes the type of play (pass) and the formation for the play (trips) as well as an illustration of the players in the formation. Predicted plays along with statistical measures are shown.

Figure 22:
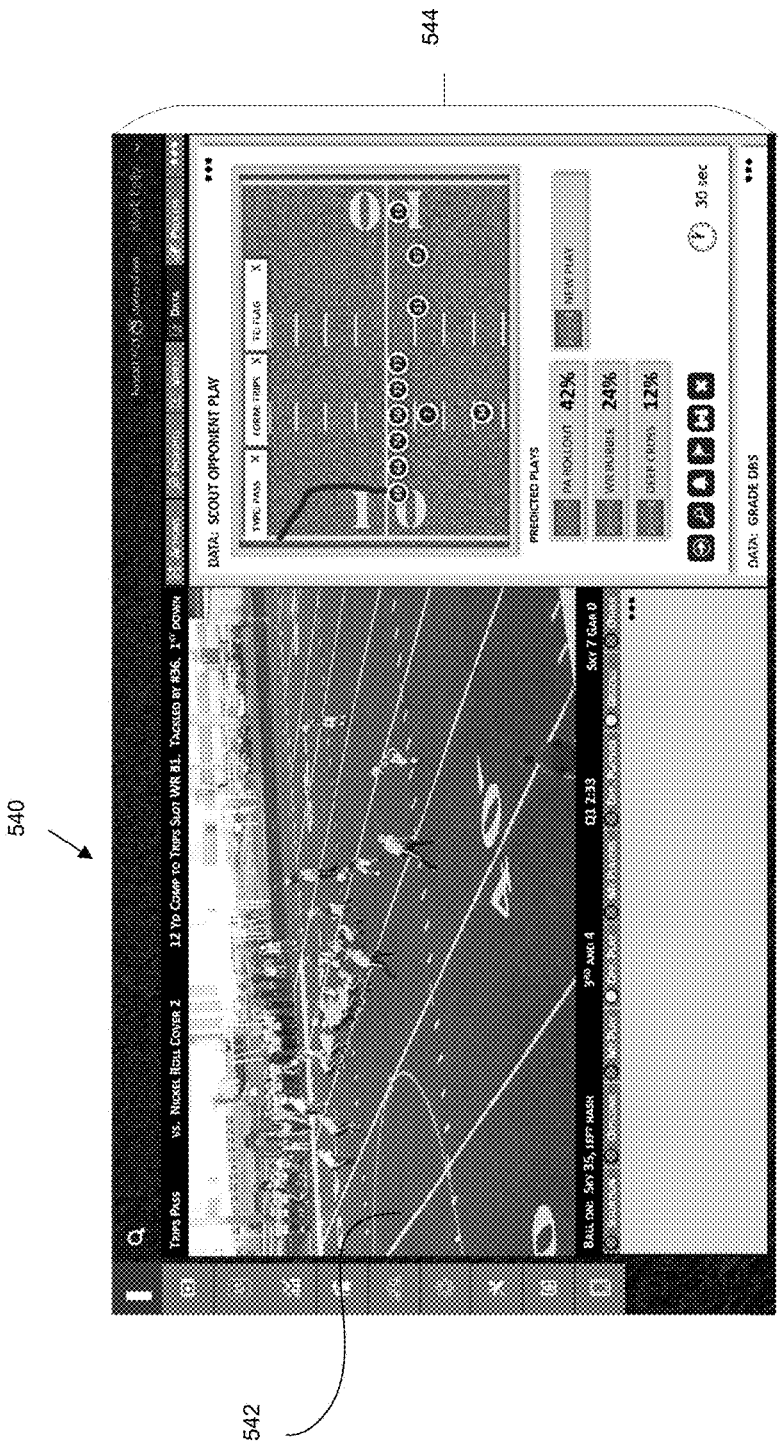
FIG. 22 is another screen display illustrating an example of film analysis.

FIG. 22 shows a screen display 540. Presented on the screen display is video 542 of a play. To the right is a view of data 544 associated with the play in which the user hand draws the route for the tight end consistent with the play shown in the video 542. In the manner previously explained, the system identifies the hand drawn route as a flag route and tags the play according. In addition, statistical predictions for the play are shown.

Figure 23:
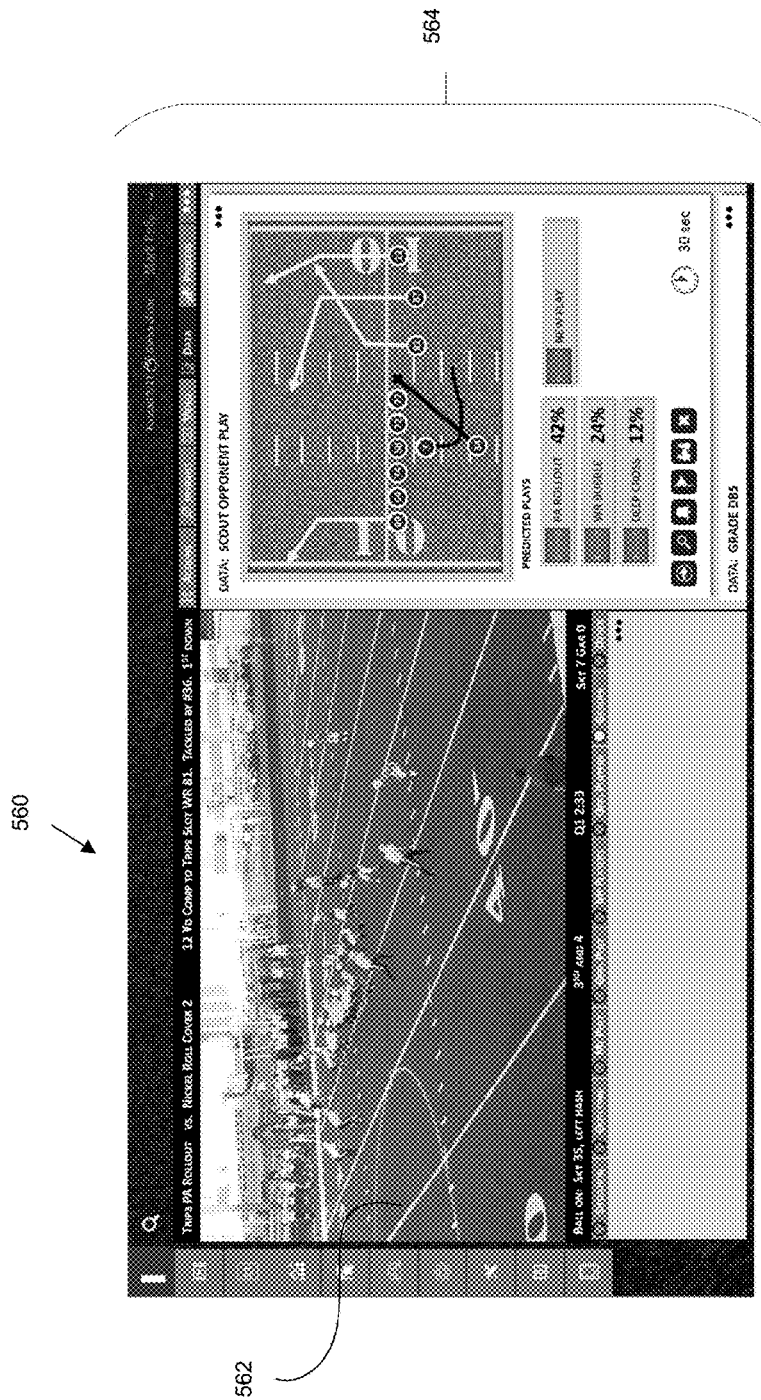
FIG. 23 is another screen display illustrating an example of film analysis.

FIG. 23 shows a screen display 560 with video 562 and a view of data 564. The route for the tight end has been redrawn and other routes or player assignments are shown as well statistical predictions for the play.

Figure 24:
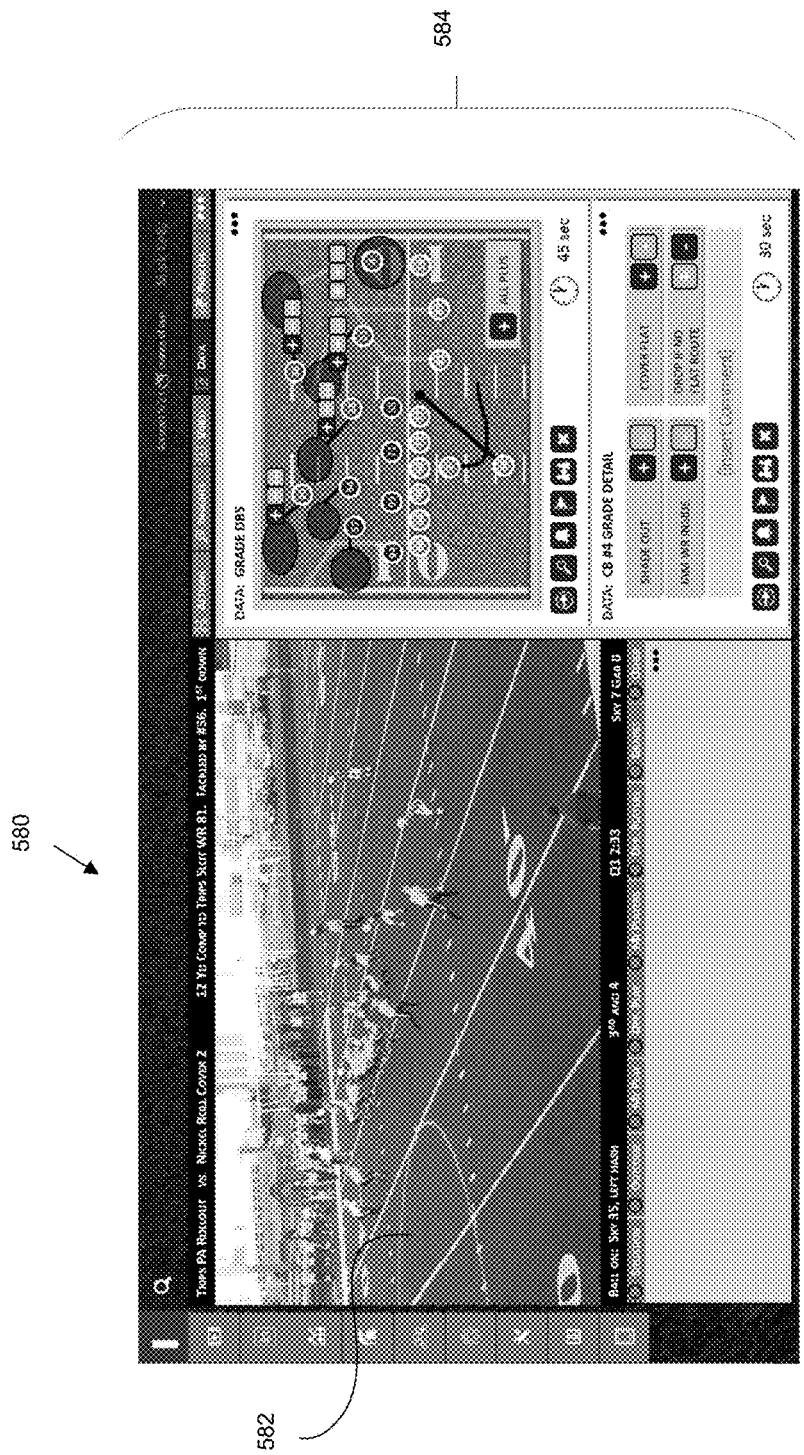
FIG. 24 is another screen display illustrating an example of film analysis.

FIG. 24 shows a screen display 580 with video 582 and a view of data 582. Here, the routes and assignments are shown and players may be graded. In this instance a corner back may be graded by determining if they performed in a manner consistent with their assignment. In addition, comments regarding the player's performance may be added.

Figure 25:
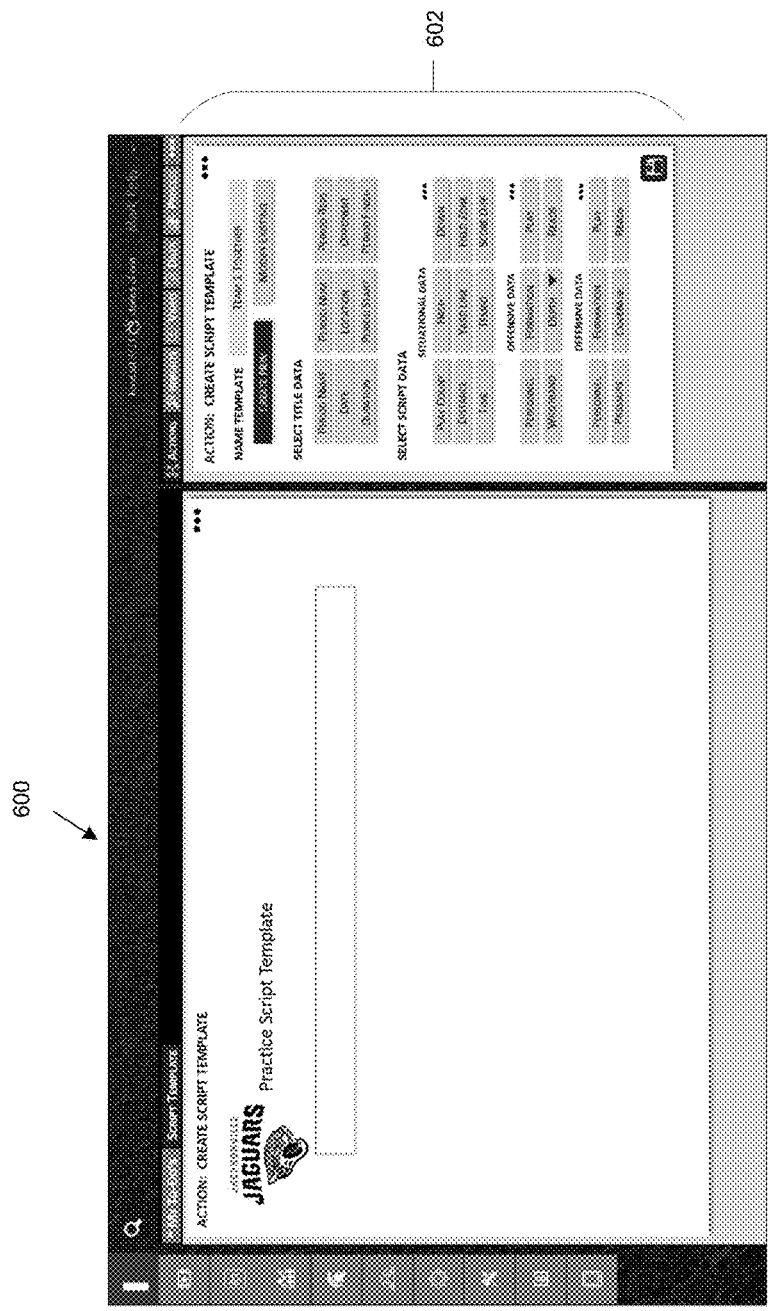
FIG. 25 is a screen display associated with creating a script template, in this instance a practice script template.
Figure 26:
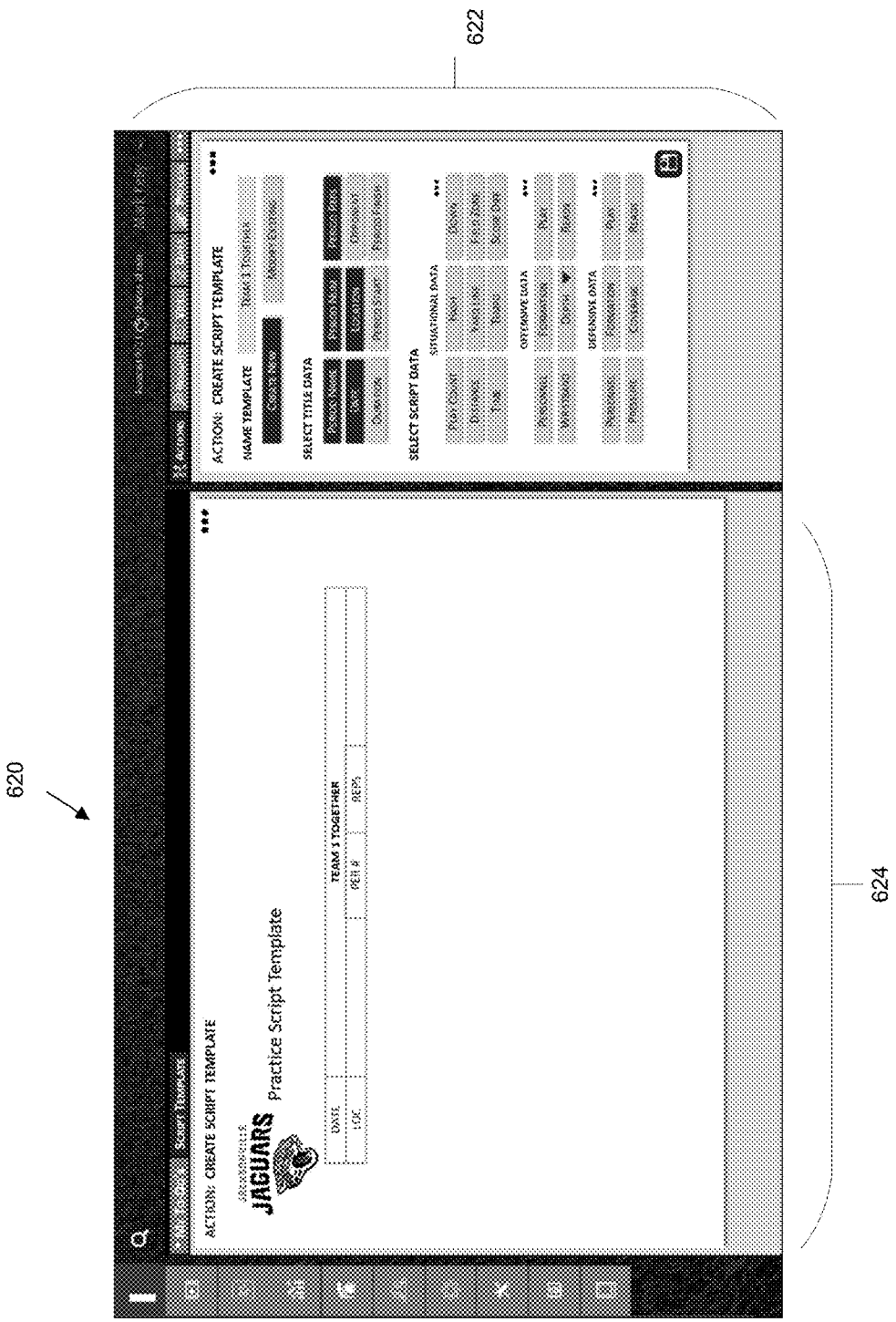
FIG. 26 is another screen display associated with creating a script template, in this instance a practice script template.
Figure 27:
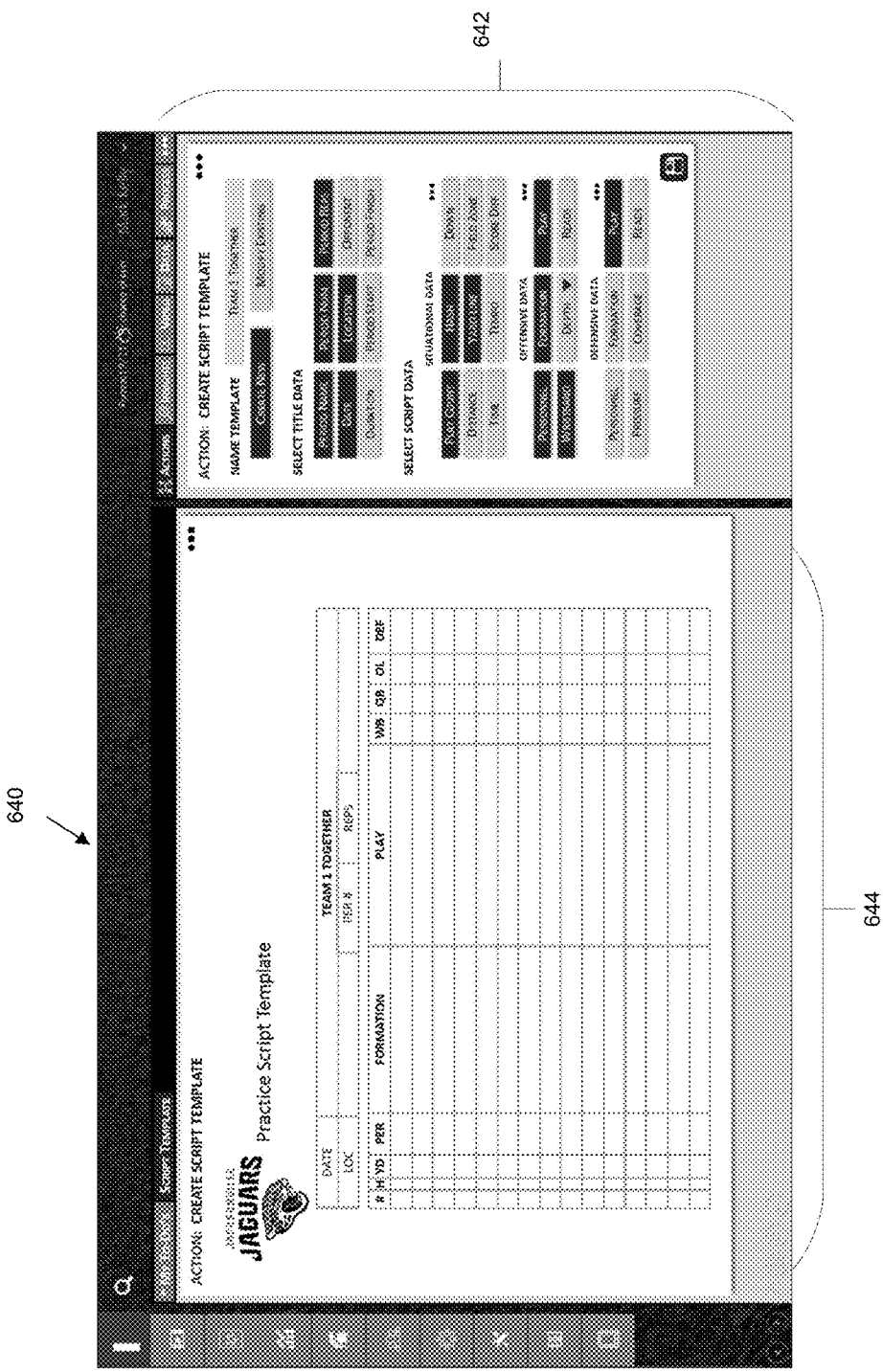
FIG. 27 is another screen display associated with creating a script template, in this instance a practice script template.

FIGS. 25-27 illustrate screen displays associated with creating a script template, in this instance a practice script template. Creating a script template is one example of an action which may be taken. In FIG. 25, screen display 600 with a view 602 associated with the create script template action is shown. In FIG. 26, a screen display 620 with a view 622 is shown indicating that various types of title data may be tagged to the template. The practice script template is shown in a view 624. FIG. 27 illustrates a screen display 640 with a view 642 indicating selected script data. The resulting practice script template is shown in a view 644.

Figure 28:
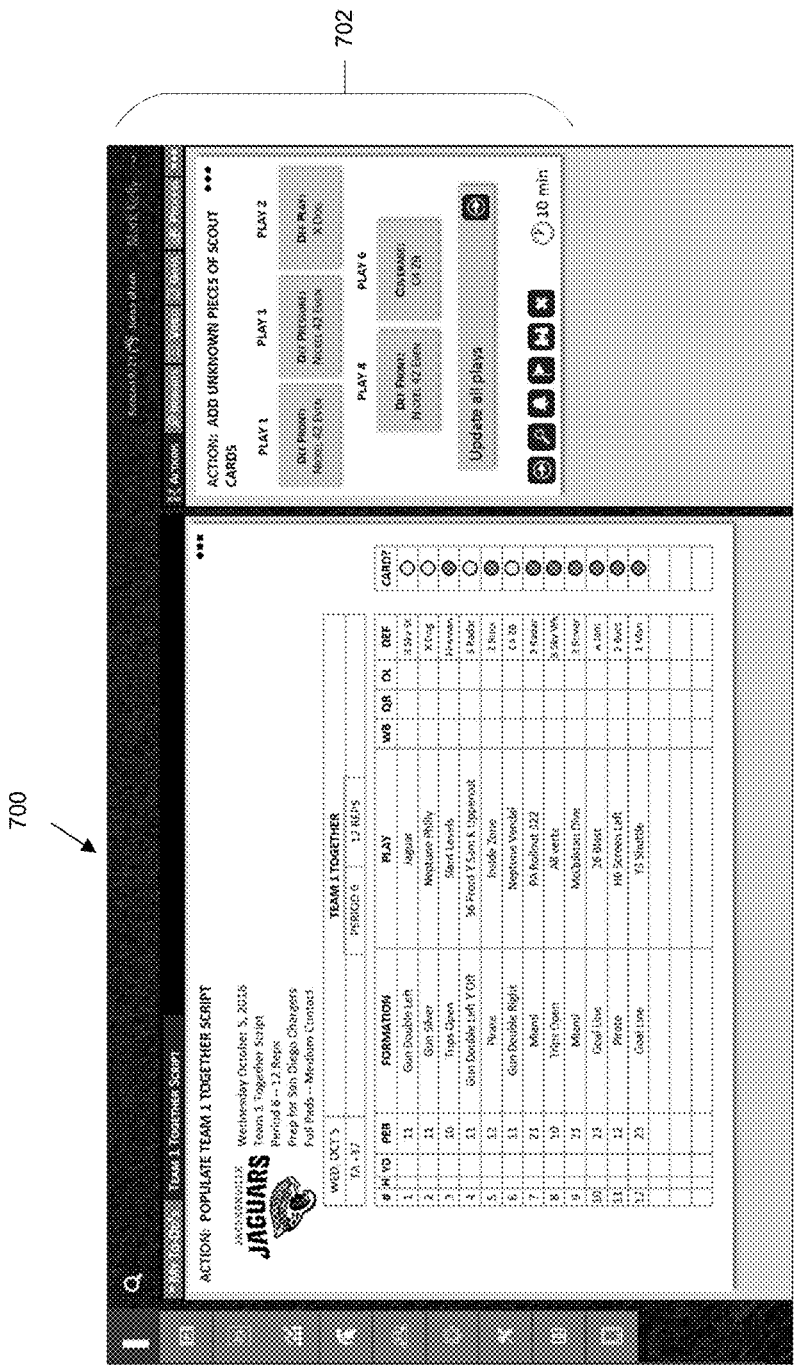
FIG. 28 is a screen display associated with planning.
Figure 29:
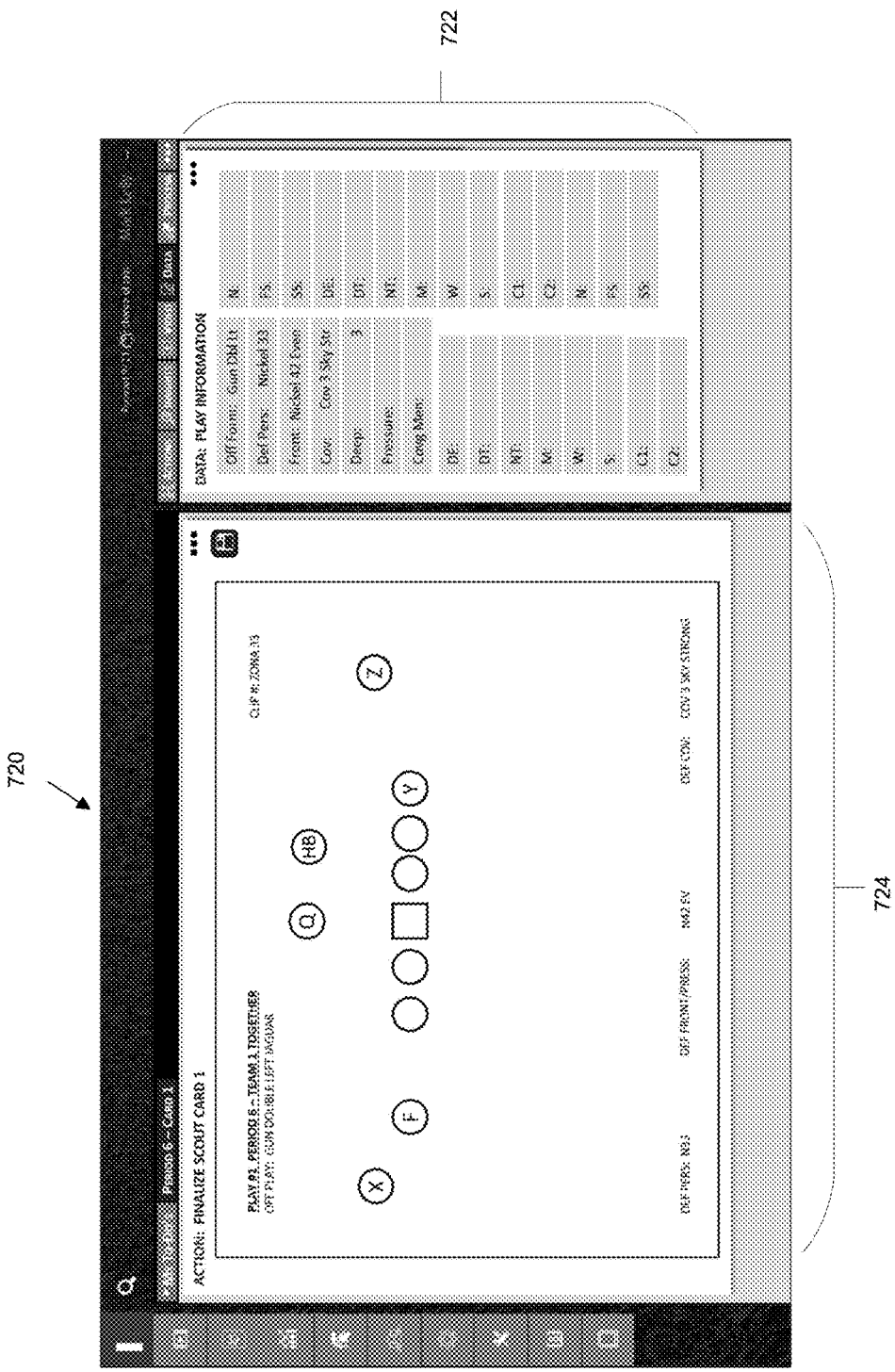
FIG. 29 is another screen display associated with planning.
Figure 30:
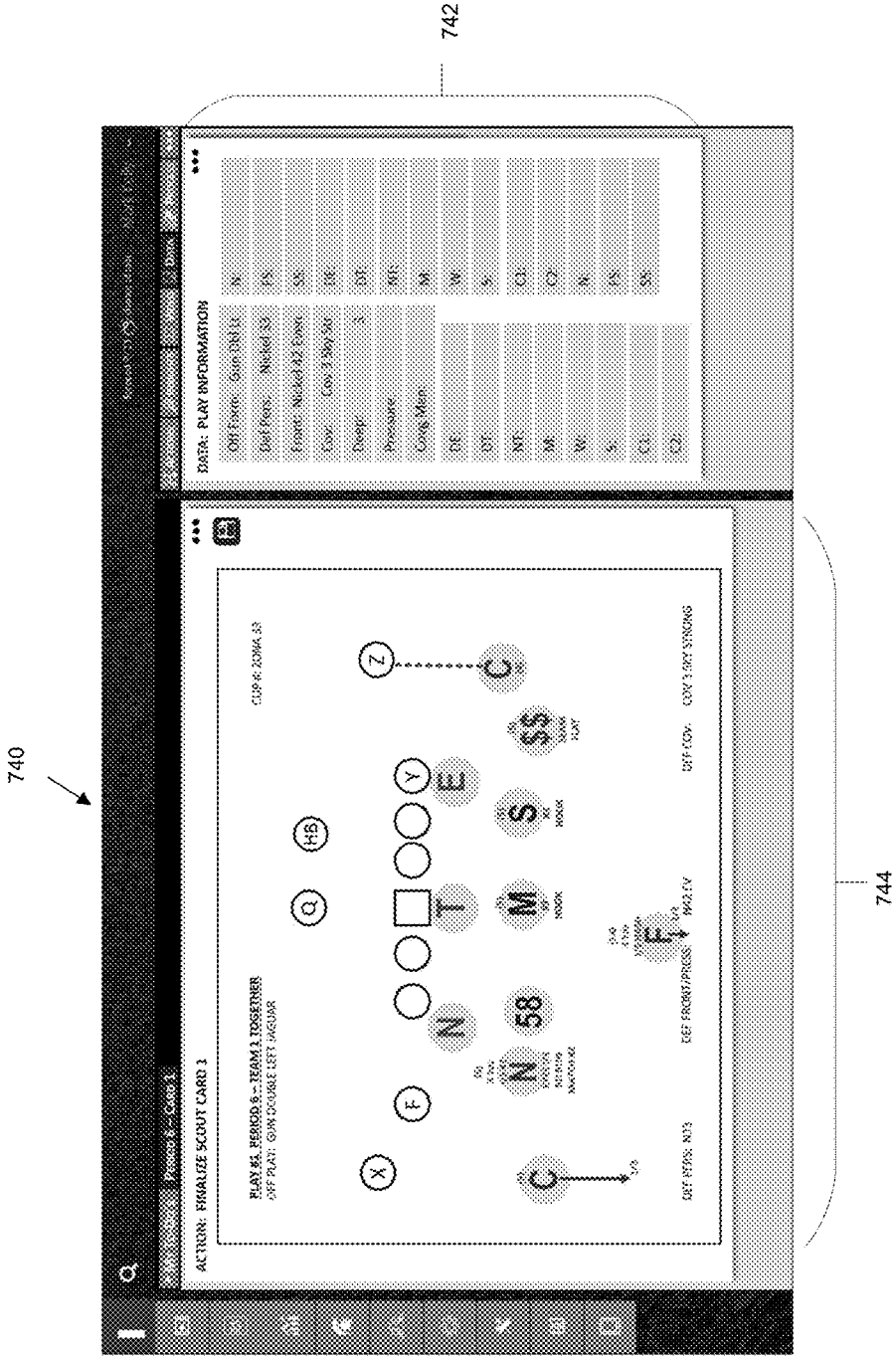
FIG. 30 is another screen display associated with planning.
Figure 31:
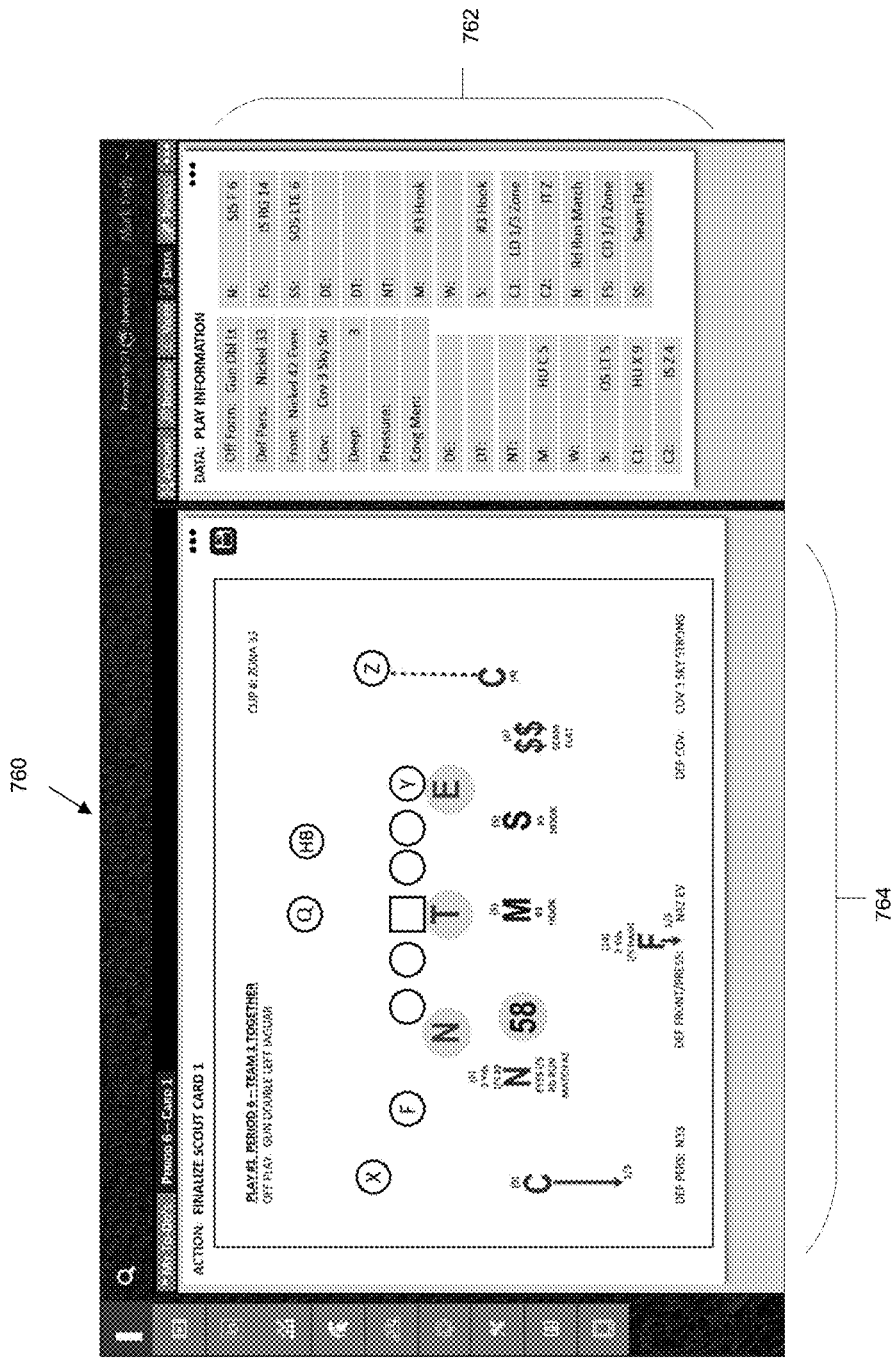
FIG. 31 is another screen display associated with planning.
Figure 32:
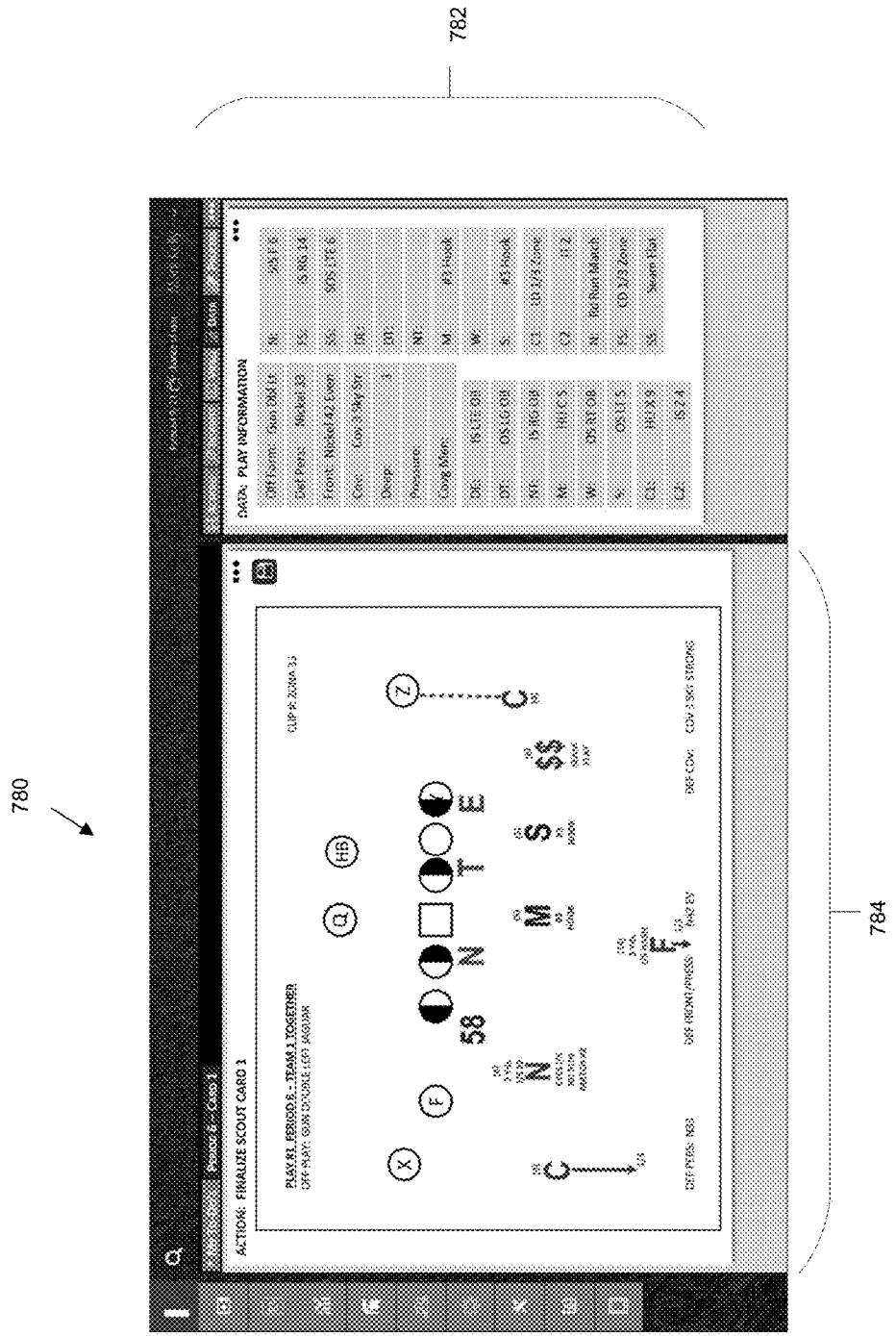
FIG. 32 is another screen display associated with planning.
Figure 33:
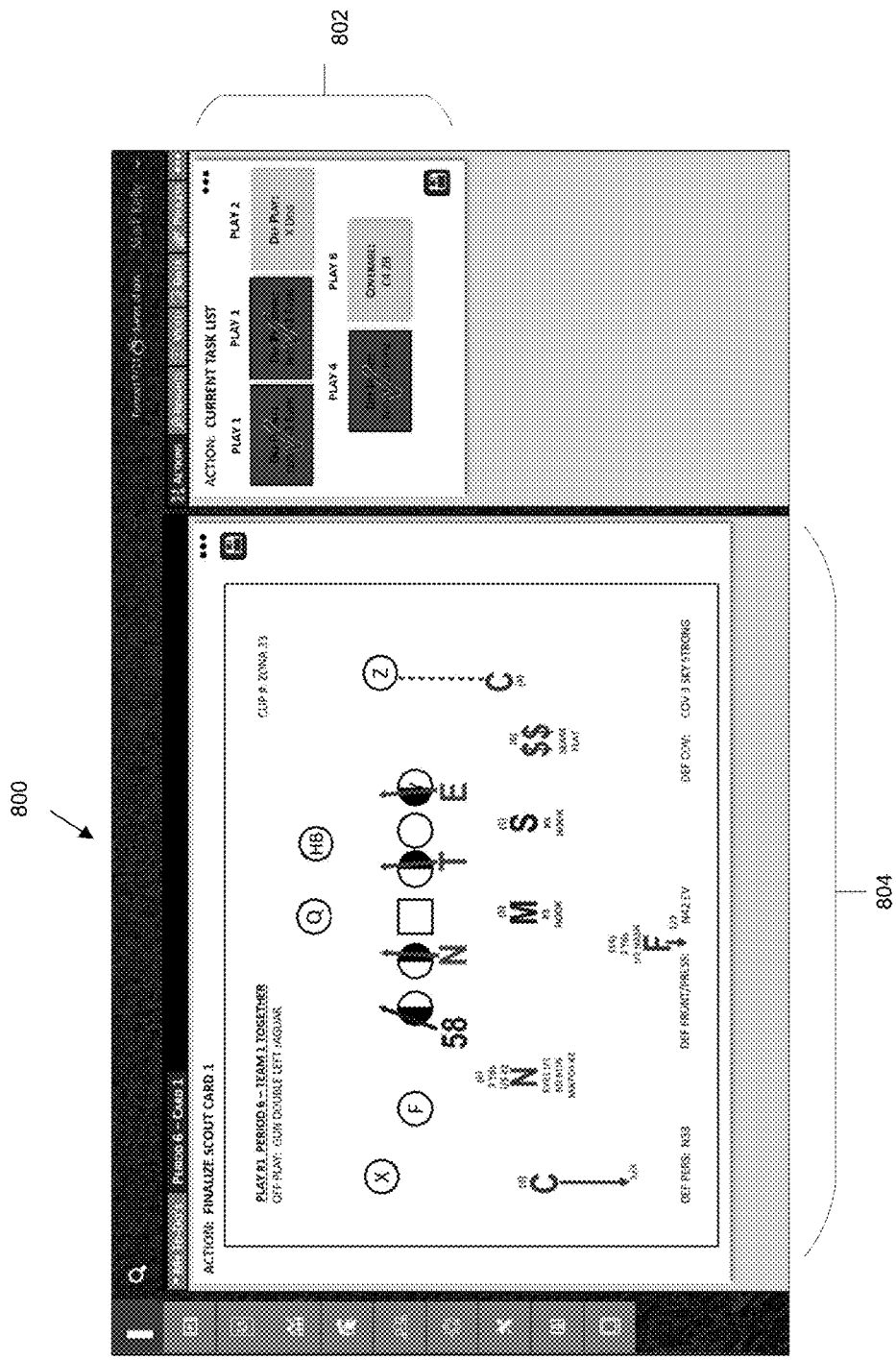
FIG. 33 is another screen display associated with planning.
Figure 34:
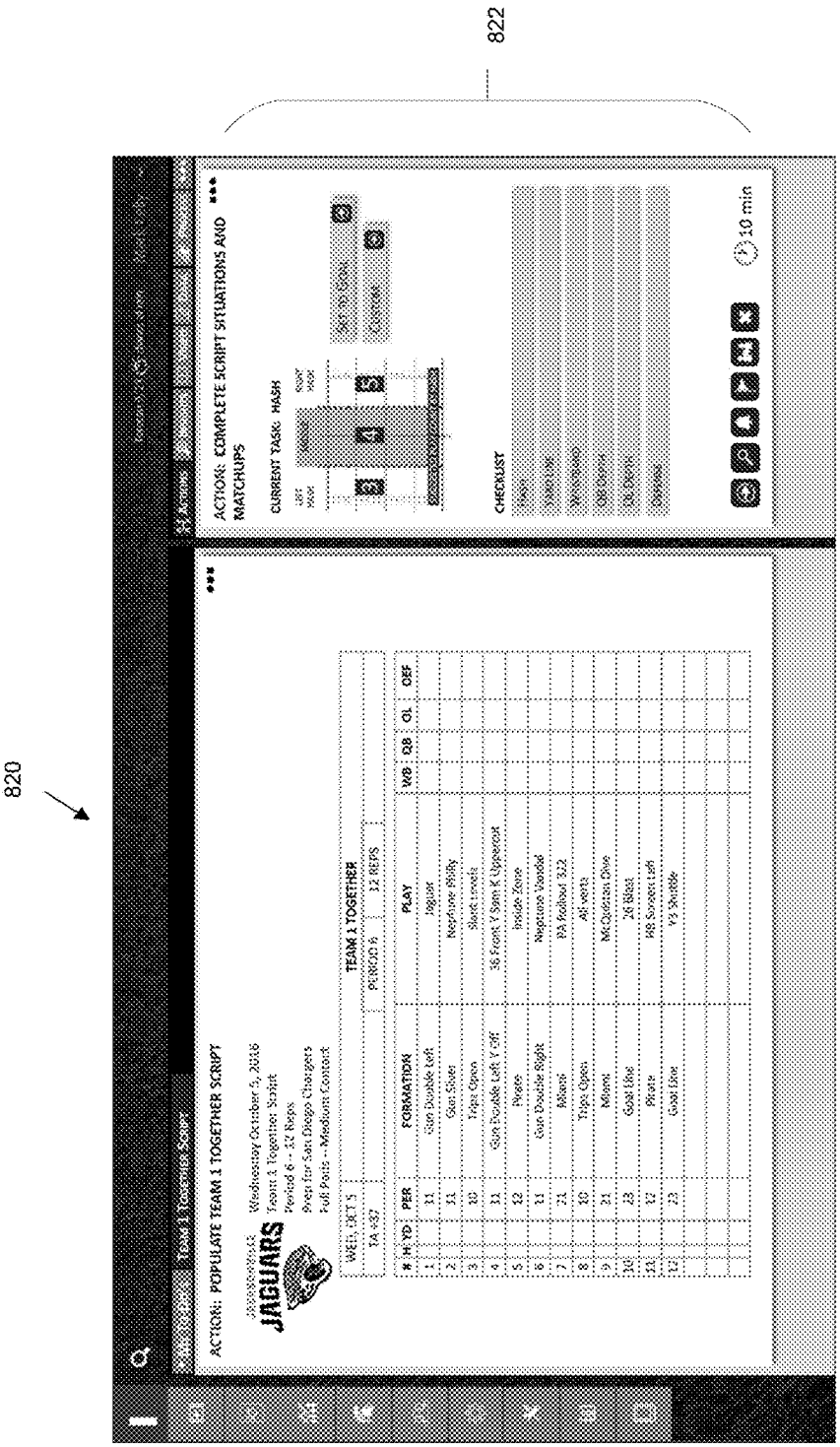
FIG. 34 is another screen display associated with planning.
Figure 35:
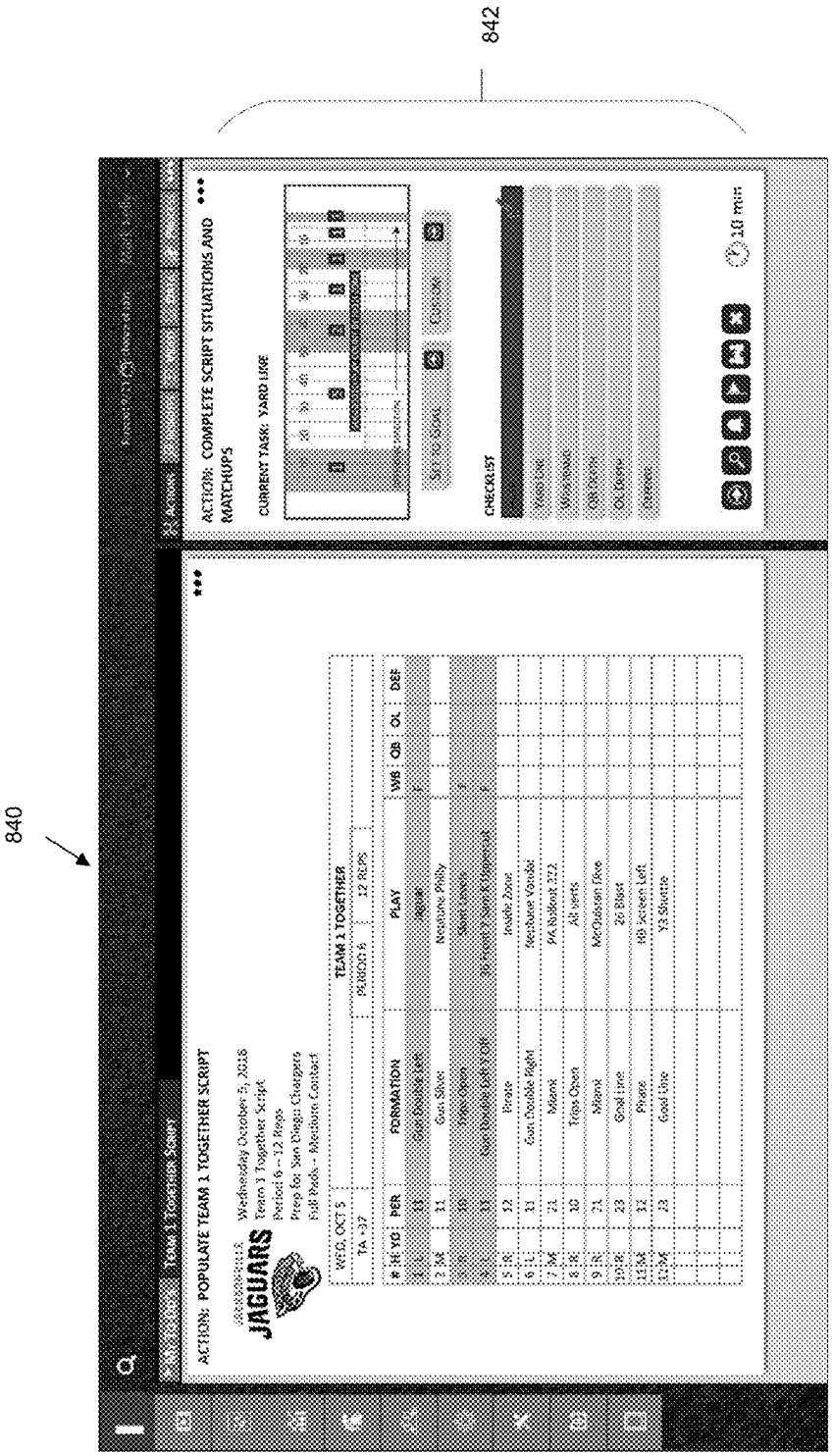
FIG. 35 is another screen display associated with planning.

FIG. 28-39 illustrate screen displays associated with planning. As shown in FIG. 28, there is a screen display 700. To the left a script is show which includes personal, formations, plays, and other information. To the right a display area 702 is shown for add unknown pieces of scout cards. In FIG. 29, there is a screen display 720. To the left is a representation of a scout card 724 showing a play. To the right is a data area 722 showing play information for the play. In FIG. 30, a screen display 740 is shown which includes a representation of a scout card 744 with play information 742 on the right. In FIG. 31, another screen display 760 is shown which includes a representation of a scout card 764 with a data view showing play information 762 on the right. In FIG. 32, a screen display 780 is shown which includes a view of a scout card 784 and a data view showing play information 782. In FIG. 33, a screen display 800 is shown which includes a view of a scout card 804 and a data view showing a current task list 802 including which plays have been completed and which plays have not been completed. FIG. 34 illustrates a screen display 820 which includes a script 824 and a view for action 822, in this instance the action is to complete script situations and matchups. In FIG. 35, a screen display 840 is shown which includes a script 844 and a view for action 842 which shows a checklist for tasks.

Figure 36:
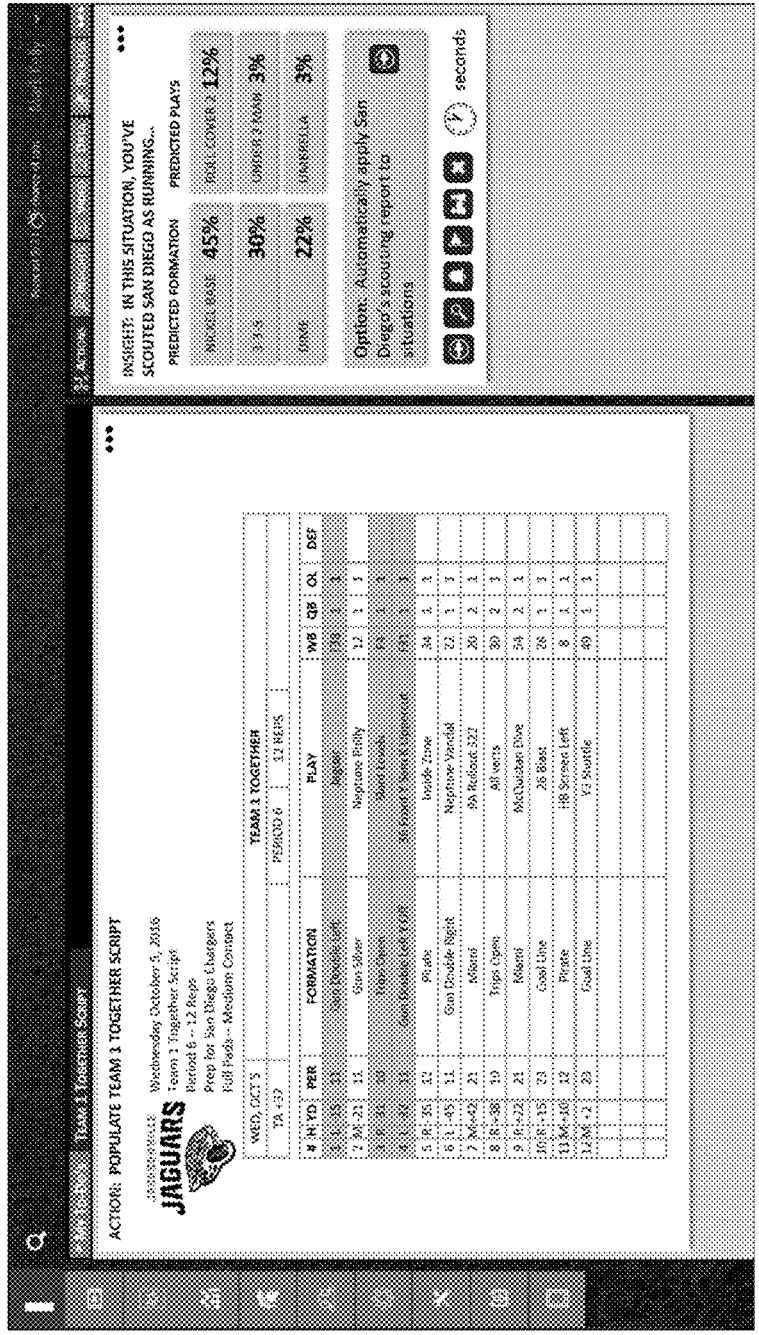
FIG. 36 is another screen display associated with planning.

In FIG. 36, a screen display 860 is shown which includes a script 86. To the write is a view 862 which provides an insight. In this instance, it is observed that the opponent team will run a predicted formation or predicted plays. The scouting report for the opponent team may be applied to this situation.

Figure 37:
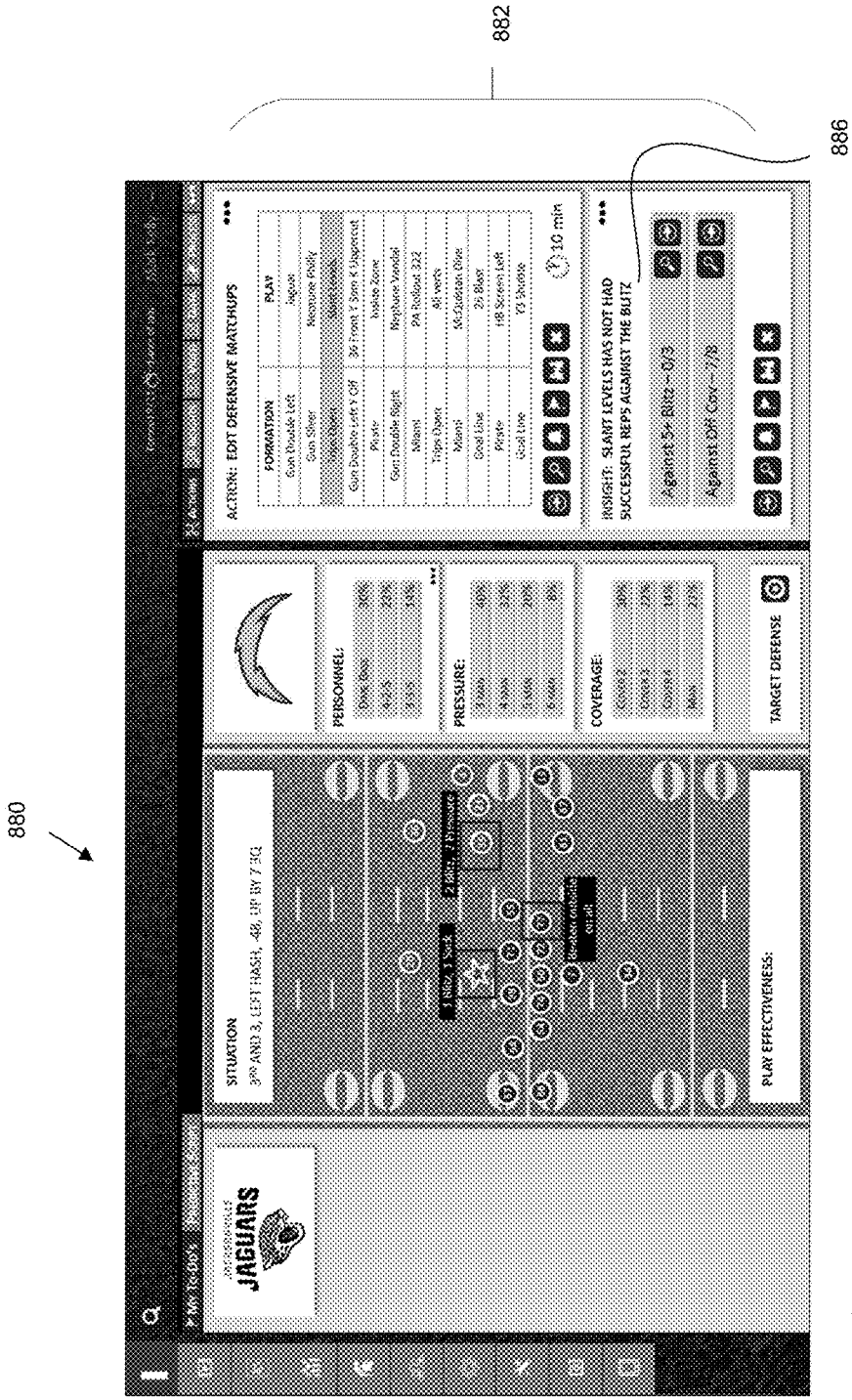
FIG. 37 is another screen display associated with planning.

In FIG. 37, a screen display 880 is shown which includes a situation, play and other data 884 at left. At right an action area 882 allows for editing defensive matchups. In addition, an insight 886 is provided indicating that a particular play has not been successful against a particular defensive play call (blitz). The insight also indicates that the particular play (Slant Levels) has been successful 0/3 times against a particular defense (blitz), and 7/8 times against another defense. Thus, insight may be provided to assist in play calling, matchup, and other coaching aspects.

Figure 38:
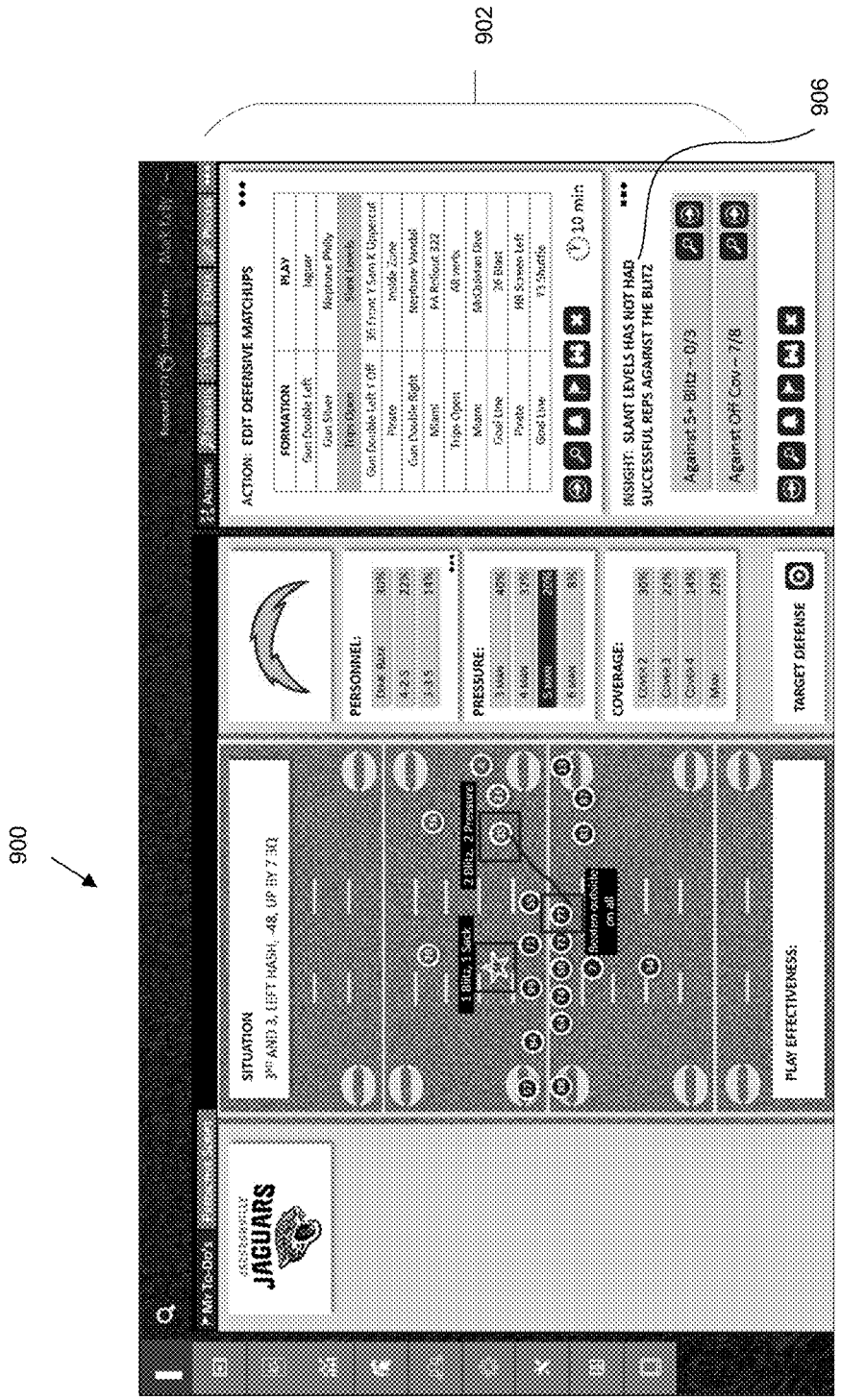
FIG. 38 is another screen display associated with planning.

In FIG. 38, a screen display 900 is shown which includes a situation, play and other data 904 including personnel, pressure, coverage, and target defense. At the right an action area 902 that provides for editing defensive matchups and includes an insight 906.

Figure 39:
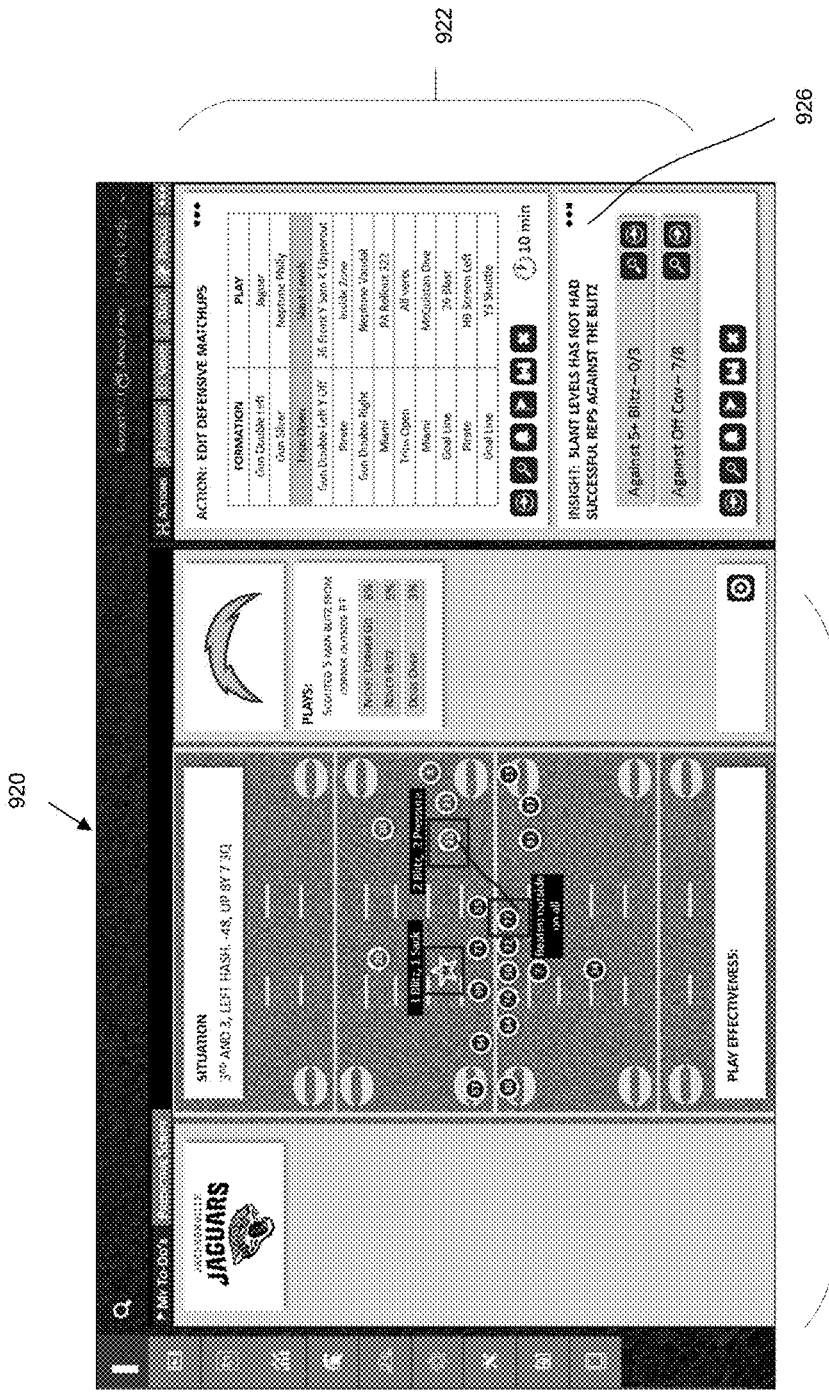
FIG. 39 is another screen display associated with planning.

In FIG. 39, another screen display 920 is shown which includes a situation, play and other data 904. At the right an action area 922 is shown that provides for editing defensive matchups and includes an insight 926.

Throughout the various screen displays provided, note the use of the various experiences to provide for receiving user input and providing analysis in a natural and intuitive manner.

Data Flow

Another aspect relates to data flow. To make the insight usable, there are multiple processes involved which each may include multiple steps. The processes may include: 1) The Data Collection and Classification Process, 2) The Data Integration and Analysis Process, and 3) The Data Prioritization, Delivery, Mobilization, and Storage Process.

Each individual experience may have unique properties within Process 1 and 3, while Process 2 combines and analyzes data from all experiences. The playbook data collection and classification process has been described.

Data Collection and Classification: The data collection and classification process involves three steps—1) the recognition of a data input, 2) conversion to a structured data format, and 3) the association of related tags for further entity description.

Step 1: The first step is simply the coach expressing information that he wants to capture, such as creating a new play. The coach creates a play by identifying the players on the field, their physical location, and their assignments. The coach can use natural interfaces like speaking or drawing, select their assignments from a list, type in the assignment, or even import plays from photo/video recognition software or motion sensors attached to players. In addition to play creation, these inputs can be used to examine execution vs. the play as scripted.

Step 2: If not in text format, the data input is converted to text format. Voice inputs use standard 'voice-to-text' conversion such as is known in the art. Outputs from data entry for drawing/motion capture/photo & video capture are a series of (X, Y) coordinates to describe a player's position on the field over time. These (X, Y) coordinates are converted via to recognized entities—either pre-defined or created in real-time.

The combination of (X, Y) coordinates can be used to describe common entities related to athletics. For example— the expression of 11 (X, Y) coordinates could be used to describe a football formation before the snap. Our systems uses 'hot zones' to recognize slight variations in coach spacing as similar types of plays. For example, if 3 WRs are positioned to the right of the RT—the system can classify it as "Trips"—even though exact positioning may vary. Despite slight uniqueness to drawing, the system can classify multiple formations similarly, for use in macro data analysis.

In addition, (X, Y) coordinates can represent the assignment of a player, or his movement over time. When a coach draws a route, a series of (X, Y) coordinates are generated and captured. The changes in (X, Y) over time and angles help the system classify common passing routes—or which defensive player should be blocked.

Based on the changes in the (X, Y) coordinates—the system recognizes key points in assignments and can map similar assignments and routes. Players can be assigned to other players (man coverage), zones (zone coverage), or to run a particular type of route. Routes can be identified by distinct pivot points and yards of each route segment.

Where a coach creates a pass route associated with a new play. A number of data points are provided with (X, Y) coordinates, changes in (X, Y) over time and slope. This information may be mapped and classified accordingly.

Beyond (X,Y) coordinates, wearable technology with multiple sensors on players can capture individual moves/techniques to be stored in the spatial database environment for further analysis. For example, if a defensive lineman pulled downward with his left arm while punching his right arm forward in the air—the system may recognize the common set of motions as a "swim move". The system may tag that motion and reference it later in multiple experiences, without the coach having manually identify it himself.

Step 3: In text formats, each entity (assignment, player, play, formation, etc.) is classified appropriately within the database. Each assignment has several corresponding tags—to describe components and properties of the assignment. For example, a post route is where a WR runs a certain number of yards up the field, then pivots to the center of the field at a 45 degree angle and continues to run. In our system, a post route would contain tags of 'initial forward', initial straight', 'pivot 45', 'pivot inside', 'pivot forward', etc. These classifications allow a route to be unique, but recognize similarities between common elements of routes. In addition, the database can factor in additional inputs to create more tags. For example, if the WR is lined up on the left side of the formation, a post route pivots to the right, since the inside of the field is to the right. Here the system may recognize this nuance and classify the assignment appropriately.

In addition, if an input is detected that has not matched to any assignment in the system automatically, the system allows the coach to manually add it or identify how it maps. If the coaches chooses not to select a specific input, tags can be generated based on the input details (initial route forward, rounded pivot, pivot inside, 1 pivot route, etc.). If the play tag is used during film analysis, additional inferences and data tags are automatically used based on the scouted defense and play outcome.

For a player assignment such as a pass route, key descriptors which are gathered from inputs are also provided including the pivot point, the personnel, the alignment, the player, the defense and the offense. Tags are also provided including those associated with the route and those inferred from the play.

Data Integration and Analysis:

Data integration phases has two distinct parts—1) the integration of relevant data from the other experiences/components (within the Athletic Intelligence System) of this coach and 2) the macro level data present from other coaches using the system in a similar situation. The data analysis phase simply leverages common techniques to analyze the data.

Step 4: The fourth overall step (and the first step of the Data Integration and Analysis Phase) integrates the data from all of the coach's experiences in the Athletic Intelligence System. Each experience within the system is designed to enhance a coach task, but also collect data in the most natural way possible. Just as the playbook is the most common experience to express assignments. The film analysis application is the most common place to express the play call, results of plays, scouting reads, and player grades. The combination of experiences results in massive amounts of data tied to entities (plays, players, coaches, games, referees, assignments, etc.)—for analysis and evaluation in the system.

For example, when a coach is reviewing film after a game (in the film analysis experience), he breaks down the game into manageable clips—for football, into plays. During each play, he expresses his play call by entering it into the system. The system then makes a data call to understand what tags it can integrate to the entity in this situation. In this example, the system would call the playbook to get the formation, personnel, and assignments of the players on the field. Then, leveraging the stated personnel (WR1, WR2, HB1. etc.)—it calls for data from the depth chart to get the specific players on the field (which could be verified by the coach). Using the formation, it calls for data from the scouting report to understand how the defense is normally aligned in response, and the personnel on the field. Then, the system could call the data from the player profiles to attach any grading the coach has done on the player, or measurable data known about the player (like height, weight, 40 yard dash, etc.). All of this data is now attached to the play, without the coach having to manually associate the data.

Step 5: The fifth overall step (and the second step of the Data Integration and Analysis Phase) leverages new data sets. In addition to supplied performance data from the coach (or player, scout, etc.), it leverages macro level insights from the Athletic Intelligence System and additional external data sources.

The previous step defined how contextual and situational data is tied to system entities to streamline the data collection process—and provide more variables to analyze situations. However, the coach must enter performance data/metrics to understand the outcome of the given situations. This is expressed through one of the experiences described in the Athletic Intelligence System, such as the film analysis application, real-time companion app, or a player evaluation experience, such as a playbook test. Additional data can be inferred—such as time a QB spends in pocket, or point of catch and yards after catch (YAC)—using some of the situational indicators.

Macro level insights can be shared when coaches encounter situations that other customers of the Athletic Intelligence System have already encountered. For example, a play called by a coach may have the same formations and assignments as 500 other coaches in the country. However, a slight variation to this play (in terms of formation and assignments) is run by 300 other coaches. The variation results in an increase in 1.5 yards per carry. This insight can be shared with the 500 coaches, without compromising personal or identifiable information from the other staffs.

The external data queries may be designed to eliminate steps for the coach and gather more intelligence. Examples here include pulling play result data from media scorers or weather at the game location from Weather.com.

Step 6: The data analysis step leverages common statistical methods to analyze the data—looking for variations in performance and the situational factors that seem to influence the resulting performance metric, for eventual delivery to the coach for action planning. This is a common industry technique, for which existing best practices may be leveraged.

Data Prioritization & Delivery, Mobilization, and Storage:

The final phase may have two steps with a unique predictive engine to prioritize insights, insight delivery integrated into multiple unique coach experiences, and automatic data ties to actions for measurement and future recommendation purposes.

Step 7: During this step, the insights created during the previous process are now prioritized, filtered, and delivered through various experiences back to the coach. Specific insights are combined with other historical insights to better predict the probability of situations for an upcoming game. For example, if the opponent often passes on $1^{st}$ and $2^{nd}$ down—they are more likely to end up in $3_{rd}$ and long than an opponent who runs on the first two plays. In this situation, scouting their $3_{rd}$ and long plays and preparing ideal defenses will be delivered as a higher priority than a different run-heavy opponent.

Rather than deliver a report to read, the insights are delivered within appropriate experiences in the Athletic Intelligence System and tied to potential actions. For example, coaches can see the opponent's most common formations (visually displayed using the playbook interface) and suggested responses (ties to action), based on the best outcome derived from other teams facing this opponent and/or similar defenses across the country (via macro data analysis). This enables the next step, where coaches draw up their defensive strategy directly into a playbook-like experience. The visual experiences and interactions provide a natural feel to the user experience and the seamless ability to collect massive amounts of data.

These experiences may also be focused for a different stakeholder, such as a player. When specific plays are confirmed by a coach as part of a game plan, the system can automatically generate a playbook test for a player—evaluating the players' knowledge of those plays. In the virtuous cycle described throughout this document, the players' responses would be collected to both deliver insight to the coach and personalize the players' practice plan and future playbook tests at an individual level.

Step 8: In this step, the coach and/or athlete indicates his desired action for the insight presented. Responses could be an action, no action, or delaying/deferring decision making. If action is selected, multiple documents and experiences will be updated automatically to reflect the coach's strategy—and additional stakeholders will be notified with information or action needed from them.

Decision making done within the application can now tie actions into measurement plans—allowing the system to understand how well various strategies work in different circumstances. This insight-action data correlation will be saved and stored within the Athletic Intelligence System for more analysis.

Step 9: The last step is simply saving all generated data and relationships into the database for both future analysis for the specific coach/team, but also macro data analysis across the landscape of coaches.

It should be apparent that the present invention includes numerous aspects each of which may have separate utility. According to one aspect, a unique conversion process of (X, Y) data to recognized athletic entities (ex: assignments, actions, positions, players, formations, etc.) enables it to utilize natural user interfaces—giving users the benefits of big data without the hassles of collection. It automatically converts seemingly unique data inputs into a structured data set, ready for traditional analysis techniques.

The process may be used to associate and tag data to entities to enable automated data analysis, delivery of deeper insights to coaches, and maximum efficiency in other coaching process. Automated data analysis will save multiple hours for every coach, every week. Deeper insights are enabled through the depth of classifications and rolling data into similar categories—enabling coaches to get the benefits of big data without requiring the user to have that skill set. Leveraging the data sources on behalf of the coach also save them large amounts of time.

Building the Athletic Intelligence System with multiple unique experiences, structured for data collection, allows coaches to optimally accomplish their tasks for the week while collecting data in the most frictionless way possible. The automatic data calls on the coach's behalf allows the coach to express the data once, but gain the benefit of expressing the data across the platform. This approach looks at each experience as a data source and complements with industry knowledge to enable maximum benefit with minimal effort/friction for a coach.

According to another aspect, leveraging data input conversion techniques is performed to create structured data from seemingly unrelated inputs for macro analysis purposes is unique. The component tagging and system structure enables the system to share insights based on macro data analysis, without giving away trade secrets of any coaching staff. This enables better recommendations for coaches using this Athletic Intelligence System.

With coaches scouting opponents on our platform, combined with the robust situational data collected surrounding situations and look-a-like coaches across the nation (or the world)—the system better understands why a play is called by the opponent. This enables the prediction engine to predict how likely situations are to occur both before and during the game—and suggest a better game plan or approach.

According to another aspect, the present invention captures specific coach actions/responses to the specific surfaced insights. This connection of insights to action enables analysis of various strategies given certain situations. Using the surrounding situational data captured in the experiences, the system may produce player profiles at a level of depth and automation. For example, the system may immediately calculate grades of players for pass blocking vs. run blocking, various blocking techniques, against different opponents, and throughout the duration of a game—suggesting players for certain system fits or assignments.

Thus, the present invention provides for systems and methods for athletic intelligence. Although various examples have been described herein, the present invention is not to be limited by or to these specific examples. As previously explained, the present invention contemplates numerous variations in the type of athletics, the number and type of different experiences, and other options, variations, and alternatives.

What is claimed is:

1. A method for providing technology-driven athletic intelligence, the method comprising:
   providing a database stored on a non-transitory computer readable medium wherein the database is structured to store data about a plurality of athletic entities, wherein the plurality of entities include entities from a set consisting of a player assignment, a player, a play, and a play formation;
   providing a plurality of applications, each of the plurality of applications configured to communicate with the database and collect contextual or situation data;
   wherein one of the plurality of applications is a practice companion application configured to build a script of a plurality plays and drills for practicing, wherein the practice companion application provides for a practice companion user interface to input contextual or situation data for building the script of a plurality plays and drills and the practice companion user interface displays the plurality of plays and drills;

wherein one of the plurality of applications is a play book application configured to build one or more plays; wherein the play book application provides a play book user interface for selecting play type, formation or players and displaying the one or more plays to a user or data associated with the one or more plays;

wherein one of the plurality of applications comprises a film analysis component to analyze what happened during a game or practice; wherein the film analysis component provides a film analysis user interface for inputting data associated with a plurality of one or more plays and displaying a film and the data associated with the plurality of one or more plays; providing an analytics engine in operative communication with the database and each of the plurality of applications;

receiving a first data input from a user through one of the plurality of applications wherein the first data input provides contextual or situation data;

storing the first data input in the database;

applying at least a first tag using the first data input to one of the entities wherein the first tag describes the one of the athletic entities; and analyzing data within the database using the analytics engine to generate insight and delivering the insight to a user through one of the plurality of applications.

2. The method of claim 1 wherein the analyzing data comprises statistically analyzing data.

3. The method of claim 1 wherein the analyzing data further comprises analyzing macro data from a plurality of teams.

4. A system for athletic intelligence, the system comprising:

a database storing data indicative of a plurality of experiences on a non-transitory computer readable storage medium;

at least one software application configured to communicate with the database and collect contextual or situation data through user input;

wherein one of the software applications is a practice companion application configured to build a script of a plurality plays and drills for practicing, wherein the practice companion application provides for a practice companion user interface to input contextual or situation data for building the script of a plurality plays and drills and the practice companion user interface displays the plurality of plays and drills;

an analytics engine executing on a processor and in operative communication with the database, wherein the analytics engine is configured to analyze the data indicative of the plurality of experiences to provide insight for use in improving athletic performance and wherein the analytics engine is configured to process the data in the database to recognize athletic entities;

a natural user interface provided by a computing device, the natural user interface in operative communication with the analytics engine and the database, wherein the natural user interface is configured to receive data input from a user;

wherein the natural user interface provides for delivery of the insights into specific coaching process and tasks wherein the natural user interface displays the insights and data associated with the insights to a user; and wherein the natural user interface provides for converting (X, Y) data to structured sets comprising recognized athletic entities; wherein the (X,Y) data corresponds to a user drawn play route or player assignments.

5. The system of claim 4 wherein the athletic entities are selected from a set consisting of plays, players, assignments, actions, positions, players, and formations.

6. The system of claim 4 further comprising at least one data tag associated with each of the plurality of experiences.

7. The system of claim 4 further comprising a separate data source associated with each of the plurality of experiences.

8. The system of claim 4 wherein the analytics engine provides for analyzing effectiveness of various strategies given certain situations.

9. The system of claim 4 wherein the analytics engine provides for producing player profiles.

10. The system of claim 4 wherein the analytics engine further provides for suggesting players for certain system fits or assignments.

11. A system for providing technology-driven athletic intelligence, the system comprising:

a database stored on a non-transitory computer readable medium wherein the database is structured to store data about a plurality of athletic entities;

a plurality of applications, each of the plurality of applications configured to communicate with the database and collect contextual or situation data;

providing a plurality of applications, each of the plurality of applications configured to communicate with the database and collect contextual or situation data;

wherein one of the plurality of applications is a practice companion application configured to build a script of a plurality plays and drills for practicing, wherein the practice companion application provides for a practice companion user interface to input contextual or situation data for building the script of a plurality plays and drills and the practice companion user interface displays the plurality of plays and drills;

wherein one of the plurality of applications is a play book application configured to build one or more plays; wherein the play book application provides a play book user interface for selecting play type, formation or players and displaying the one or more plays to a user or data associated with the one or more plays;

wherein one of the plurality of applications comprises a film analysis component to analyze what happened during a game or practice; wherein the film analysis component provides a film analysis user interface for inputting data associated with a plurality of one or more plays and displaying a film and the data associated with the plurality of one or more plays;

an analytics engine in operative communication with the database and each of the plurality of applications;

wherein the system is configured for:

receiving a first data input from a user through one of the plurality of applications wherein the first data input provides contextual or situation data;

storing the first data input in the database;

applying at least a first tag using the first data input to one of the entities wherein the first tag describes the one of the athletic entities; and analyzing data within the database using the analytics engine to generate insight and delivering the insight to a user through one of the plurality of applications.

12. The method of claim 1 wherein the first data input comprises data received from one or more imaging sensors or wearable sensors.

13. The method of claim 1, wherein the practice companion further includes a coach's personal practice schedule.

14. The method of claim 1, wherein the practice companion user interface displays templates for notes and grading of players during practice.

15. The system of claim 4, wherein the (X,Y) data comprises multiple (X,Y) coordinates generated and wherein the changes to the (X,Y) data over time and angle identify pivot points associated with a player assignment.

* * * * *